(12) United States Patent
Kajita

(10) Patent No.: US 10,996,530 B2
(45) Date of Patent: May 4, 2021

(54) LIQUID CRYSTAL DISPLAY DEVICE

(71) Applicant: Panasonic Liquid Crystal Display Co., Ltd., Himeji (JP)

(72) Inventor: Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/777,435

(22) Filed: Jan. 30, 2020

(65) Prior Publication Data

US 2020/0278585 A1 Sep. 3, 2020

(30) Foreign Application Priority Data

Feb. 28, 2019 (JP) .............................. JP2019-035901

(51) Int. Cl.
*G02F 1/1362* (2006.01)
*G02F 1/1368* (2006.01)
(Continued)

(52) U.S. Cl.
CPC ...... *G02F 1/136286* (2013.01); *G02F 1/1368* (2013.01); *G02F 1/13338* (2013.01); *G06F 3/0412* (2013.01); *G06F 3/0414* (2013.01); *G02F 2201/121* (2013.01); *G02F 2201/123* (2013.01)

(58) Field of Classification Search
CPC ........... G02F 1/13338; G02F 1/136286; G02F 2001/136295; G06F 3/041; G06F 3/0412; G06F 2203/041; G06F 2203/04103; G06F 2203/04112; B32B 2457/208; G09G 3/3659; G09G 3/3677; G09G 2310/0262; G09G 2300/0426; G09G 2300/0408
See application file for complete search history.

(56) References Cited

U.S. PATENT DOCUMENTS

2008/0018583 A1 1/2008 Knapp et al.
2012/0218199 A1* 8/2012 Kim ...................... G06F 3/0412
345/173
(Continued)

FOREIGN PATENT DOCUMENTS

JP 2008-501138 1/2008
WO 2005/116744 12/2005

*Primary Examiner* — Michael H Caley
*Assistant Examiner* — Mariam Qureshi
(74) *Attorney, Agent, or Firm* — Hamre, Schumann, Mueller & Larson, P.C.

(57) ABSTRACT

A liquid crystal display device includes: transistors and pixel electrodes respectively provided in pixels; a common electrode facing the pixel electrodes; gate lines extending along the first direction and supplying gate signals to the transistors respectively; gate lead lines extending along the second direction and respectively connected to the gate lines at at least one of a plurality of intersections between the gate lead lines and the gate lines; and data lines extending along the second direction and supplying data signals to the transistors respectively. The pixels are made up of a plurality of types of pixels arranged periodically and repeatedly along the first direction, the data lines and the gate lead lines are formed in a same layer, and either of the data lines and the gate lead lines are alternatively provided for boundaries between two pixels adjacent in the first direction.

8 Claims, 12 Drawing Sheets

(51) Int. Cl.
*G02F 1/1333* (2006.01)
*G06F 3/041* (2006.01)

(56) References Cited

U.S. PATENT DOCUMENTS

| 2014/0085256 | A1* | 3/2014 | Chen | G06F 3/044 |
| | | | | 345/174 |
| 2017/0277297 | A1* | 9/2017 | Li | G06F 3/0416 |
| 2017/0315643 | A1* | 11/2017 | Shim | G06F 3/0412 |
| 2018/0143714 | A1* | 5/2018 | Sang | G06F 3/04164 |
| 2019/0042047 | A1* | 2/2019 | Liao | H01L 27/124 |

* cited by examiner

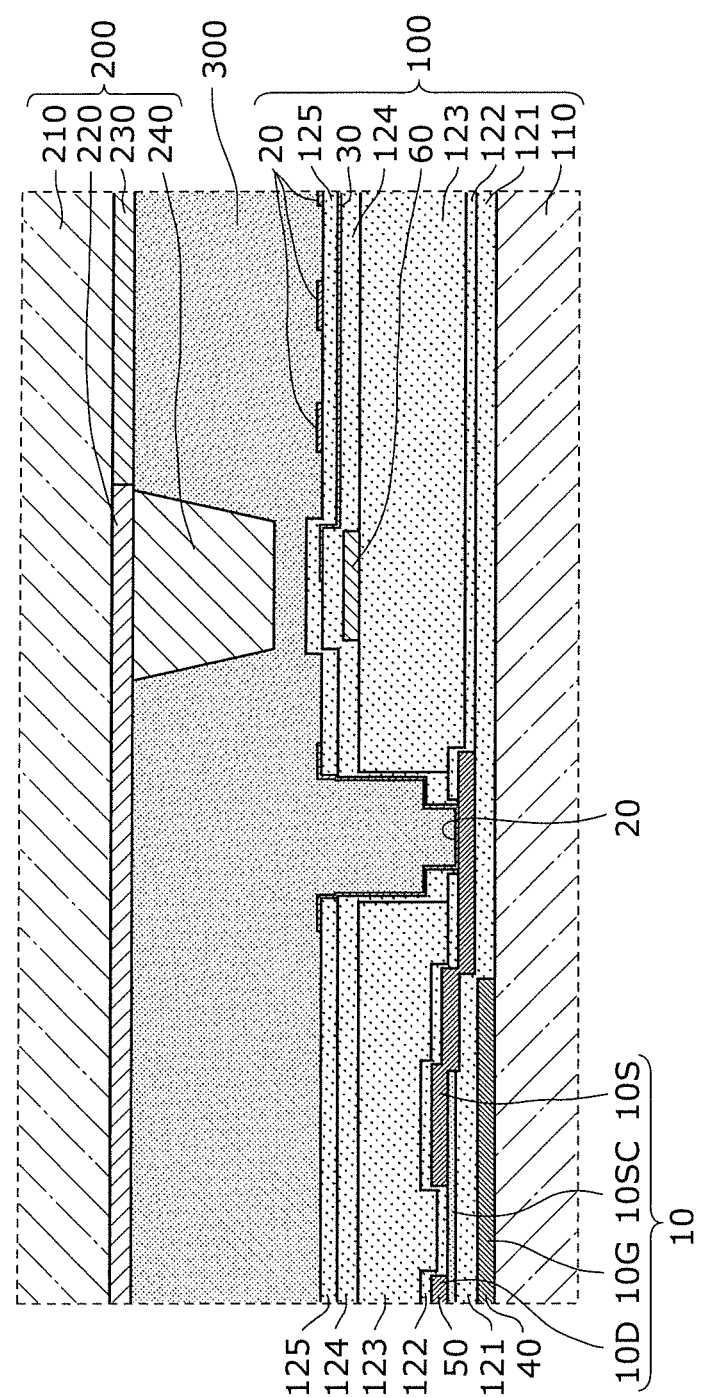

LIQUID CRYSTAL DISPLAY DEVICE

CROSS-REFERENCE TO RELATED APPLICATION

This application claims priority from Japanese application JP 2019-035901, filed on Feb. 28, 2019. This Japanese application is incorporated herein by reference.

BACKGROUND

The present disclosure relates to a liquid crystal display device.

Since it is possible to display an image with low power consumption, a liquid crystal display device is used as an image display device of a television, a monitor, or the like. The liquid crystal display device includes transistors provided in each of a plurality of pixels arranged in a matrix, a plurality of gate lines extending along the row direction, and a plurality of data lines extending along the column direction. In a frame region of the liquid crystal display device, a gate driver that supplies gate signals to the plurality of gate lines and a source driver that supplies data signals to the plurality of source lines are mounted.

Generally, the gate driver and the source driver are provided on different sides of the frame region, but there is known a technique for providing the gate driver and the source driver on the same side of the frame region for the purpose of narrowing the frame (e.g., Japanese translation of PCT publication No. 2008-501138).

SUMMARY

As described above, when the gate driver and the source driver are provided on the same side of the frame region, the gate driver does not exist on the extension in the direction in which the gate line extends, and thus, even when the gate line is extended to the frame region along the row direction, the gate line cannot be connected to the gate driver.

Then, in order to connect the gate line and the gate driver, it is conceivable that a gate lead line extending along a direction orthogonal to the gate line is separately formed as a relay wire, and the gate line and the gate driver are connected via the gate lead line.

In this case, since the gate lead line extends in the same direction as the data line, it is conceivable that the gate lead line and the data line are formed in the same layer in order to reduce an increase in the number of masks in the manufacturing process.

However, when the gate lead line and the data line extend in the same direction and are formed in the same layer, the gate lead line is also disposed between the pixels where the data line is disposed. Thereby, two wires of a gate lead line and a data line are disposed in one space between the pixels. This results in decreases in aperture ratio and transmittance of the pixel and deterioration in image quality.

The present disclosure provides a liquid crystal display device capable of preventing the deterioration in image quality even when the gate lead line and the data line intersecting the gate line extend in the same direction and are formed in the same layer.

A liquid crystal display device according to the present disclosure has an image display region made up of pixels arranged in a first direction and a second direction intersecting the first direction. The liquid crystal display device includes: transistors and pixel electrodes respectively provided in each pixels; a common electrode facing the pixel electrodes; gate lines extending along the first direction and supplying gate signals to the transistors respectively; gate lead lines extending along the second direction and each connected to a corresponding one of the gate lines at at least one of a plurality of intersections with the gate lines; and data lines extending along the second direction and supplying data signals to the transistors respectively. The pixels are made up of a plurality of types of pixels arranged periodically and repeatedly along the first direction, and the data lines and the gate lead lines are formed in a same layer, and provided periodically and repeatedly at corresponding boundarys between two of the pixels adjacent in the first direction.

BRIEF DESCRIPTION OF THE DRAWINGS

FIG. 5 is a cross-sectional view showing a configuration around a transistor in a pixel of the liquid crystal display device according to the first exemplary embodiment;

DETAILED DESCRIPTION

Figure 1:
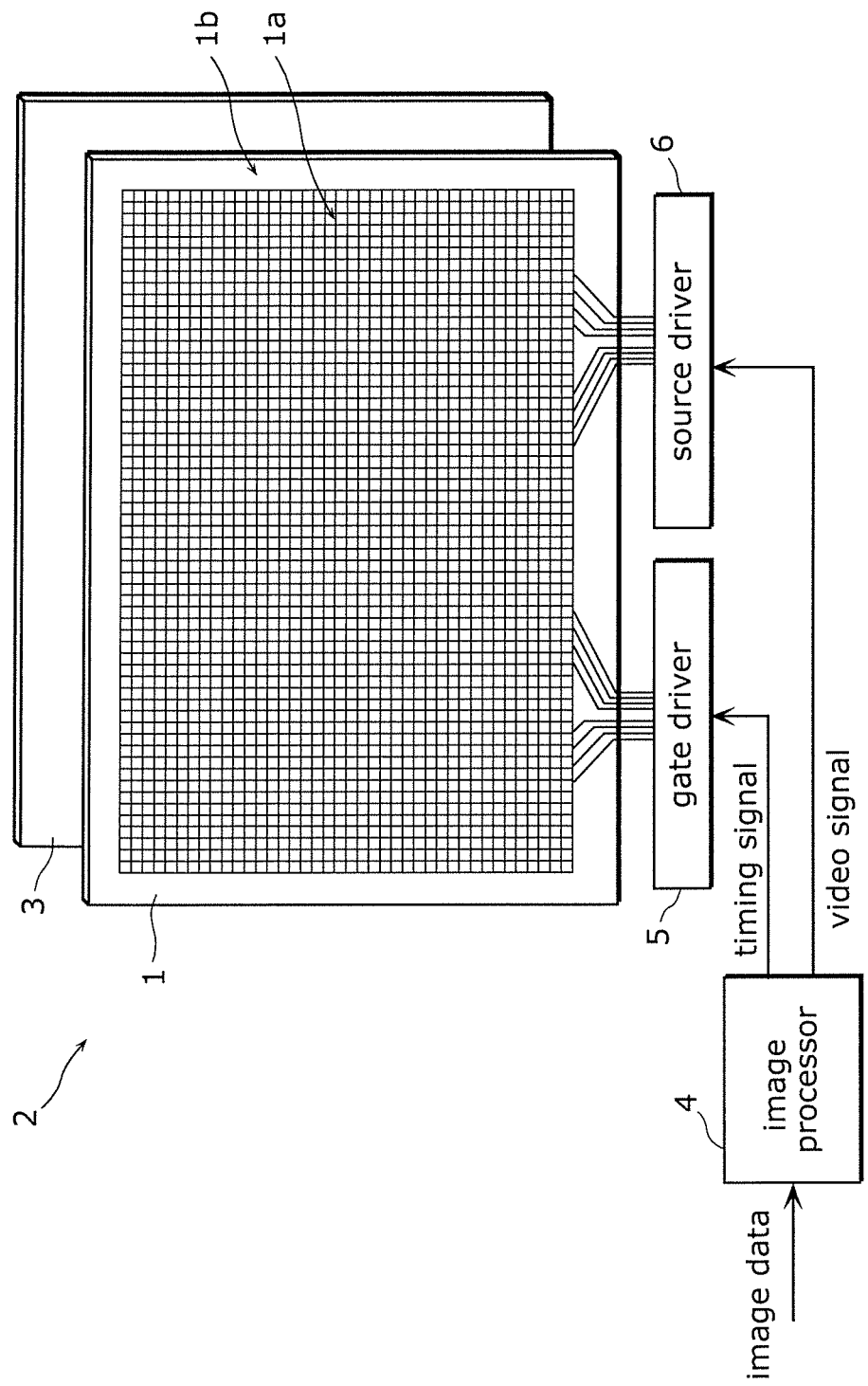
FIG. 1 is a diagram schematically showing a schematic configuration of a liquid crystal display device according to a first exemplary embodiment.

Hereinafter, exemplary embodiments will be described with reference to the drawings. The following exemplary embodiments provide comprehensive or specific examples of the present disclosure. Numerical values, shapes, materials, components, disposition positions of the components, connection modes of the components, steps, and order of the steps that are illustrated in the following exemplary embodiments are examples, and therefore are not intended to limit the present disclosure. Among the components in the following exemplary embodiments, the components that are not recited in the independent claims indicating the broadest concept are described as an optional component.

The drawings are schematic diagrams, and not necessarily strictly illustrated. In the drawings, substantially the same configuration is designated by the same reference numerals, and overlapping description will be omitted or simplified.

First Exemplary Embodiment

Figure 2:
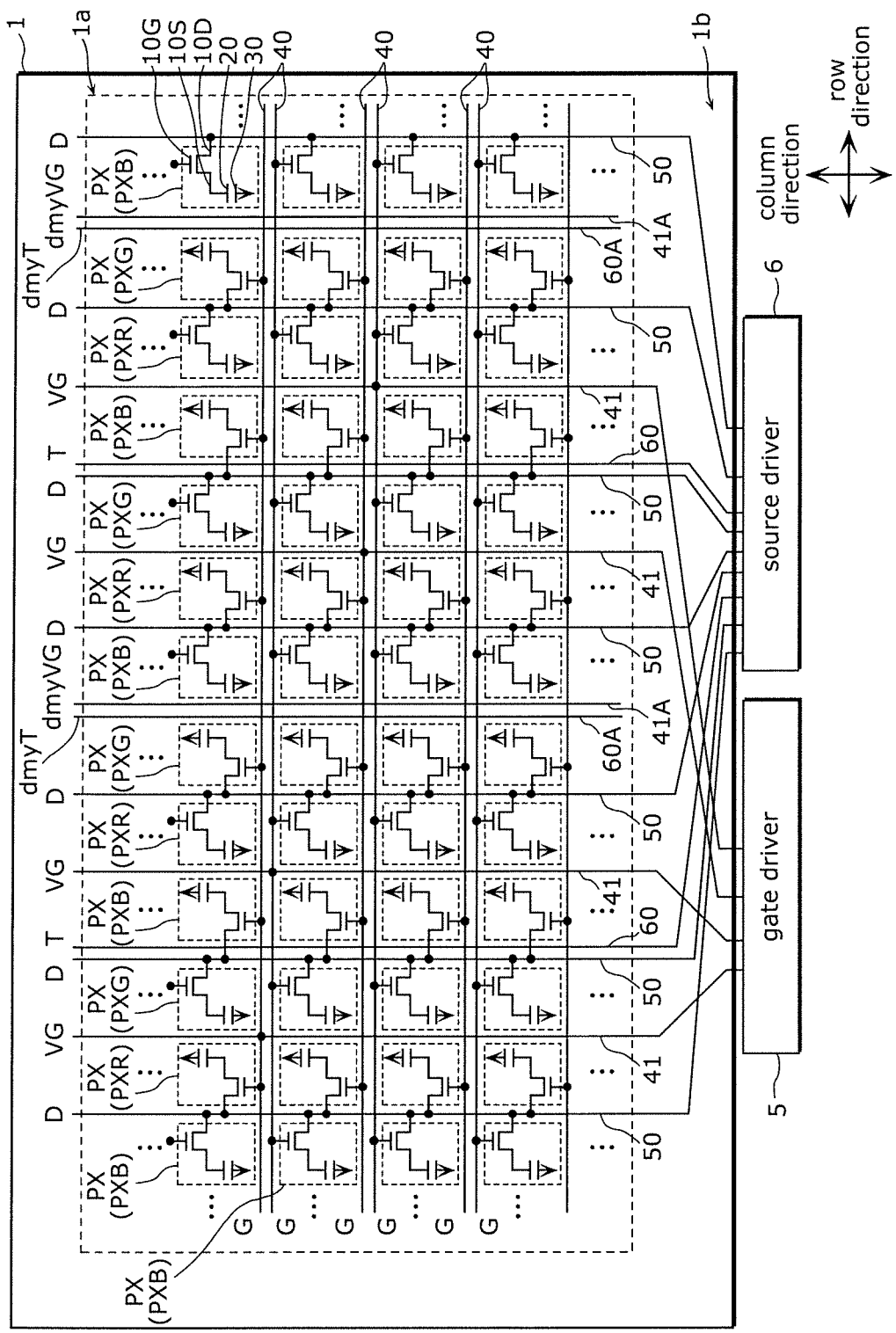
FIG. 2 is a diagram showing a pixel circuit of a liquid crystal display device used in the image display device according to the first exemplary embodiment.
Figure 3:
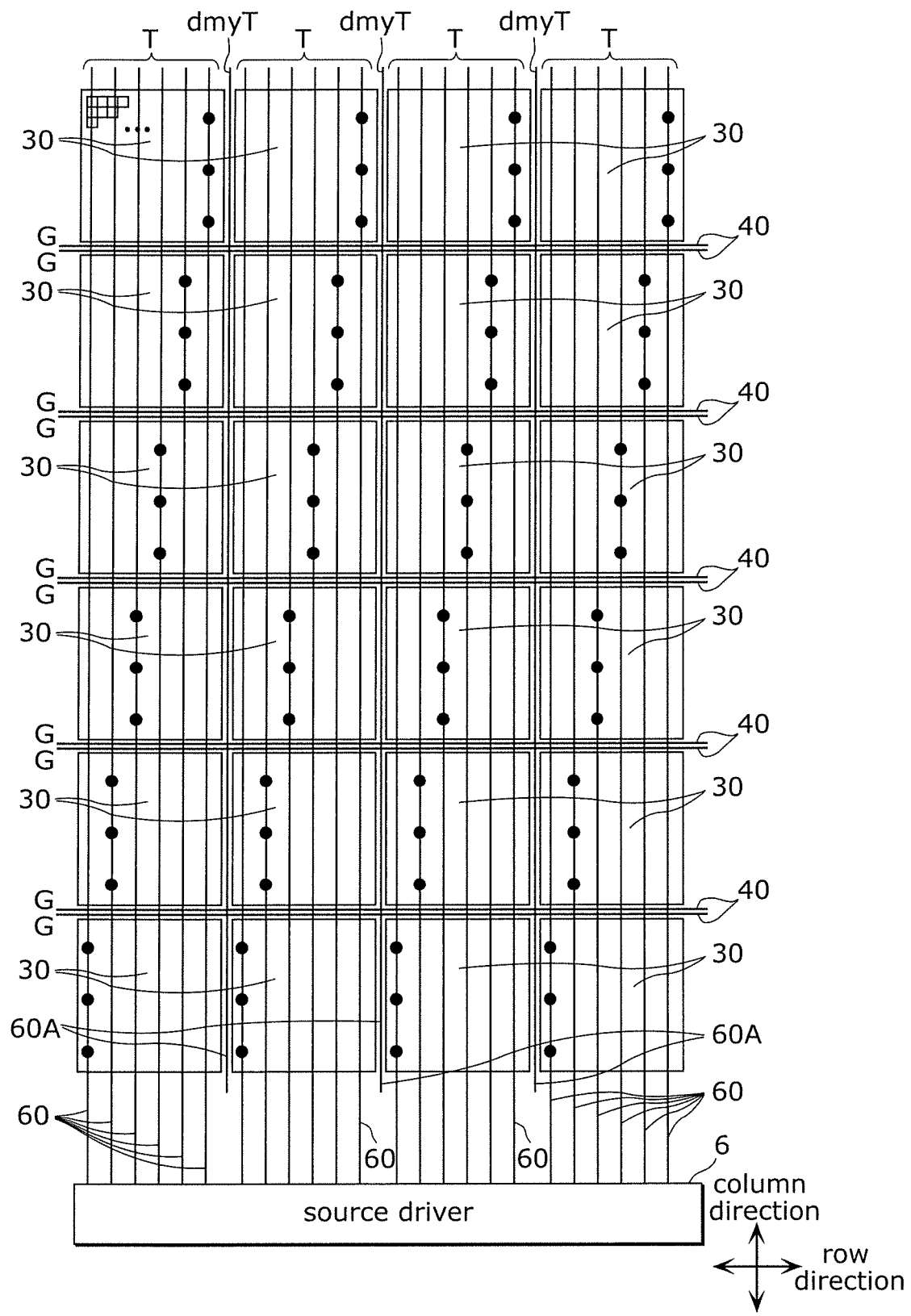
FIG. 3 is a diagram showing an example of an arrangement of common electrodes in the liquid crystal display device according to the first exemplary embodiment.

A schematic configuration of image display device 2 including liquid crystal display device 1 according to a first exemplary embodiment will be described with reference to FIGS. 1 to 3. FIG. 1 is a diagram schematically showing a schematic configuration of image display device 2 according to the first exemplary embodiment. FIG. 2 is a diagram showing a pixel circuit of liquid crystal display device 1 used in the same image display device 2. FIG. 3 is a diagram showing an example of the arrangement of common electrodes 30 in the same liquid crystal display device 1. In FIG. 2, "G" denotes gate line 40, "D" denotes data line 50, "T" denotes touch line 60, "VG" denotes gate lead line 41, "dmyT" denotes dummy touch line 60A, and "dmyVG" denotes dummy gate lead line 41A. In FIG. 3, black circles indicate contact portions between the respective common electrodes 30 and touch lines 60.

Image display device 2 is an example of a display device that displays an image (video) of a still image or a moving image. As shown in FIG. 1, image display device 2 includes liquid crystal display device 1, backlight 3, and image processing unit 4.

Liquid crystal display device 1 is a liquid crystal display panel on which an image is displayed. Liquid crystal display device 1 is disposed on a light emission side of backlight 3. Therefore, light emitted from backlight 3 enters liquid crystal display device 1.

A liquid crystal driving method of liquid crystal display device 1 is a horizontal electric field method such as an in-plane switching (IPS) method and a fringe field switching (FFS) method. In liquid crystal display device 1, for example, voltage control is performed by a normally black method, but the voltage control method is not limited to the normally black method.

As shown in FIGS. 1 and 2, liquid crystal display device 1 includes image display region 1a (active region) and frame region 1b surrounding image display region 1a. A color image or a monochrome image is displayed in image display region 1a.

Image display region 1a is a display region (effective region) in which an image is displayed, and includes, for example, a plurality of pixels PX arranged in a first direction and a second direction intersecting the first direction. In the present exemplary embodiment, the first direction and the second direction are orthogonal to each other. Specifically, the first direction is the row direction, and the second direction is the column direction orthogonal to the row direction. Therefore, image display region 1a is made up of a plurality of pixels PX arranged in the row direction and the column direction. That is, the plurality of pixels PX are arranged in a matrix.

Frame region 1b is a peripheral region of liquid crystal display device 1 and is located outside image display region 1a. Frame region 1b is a non-display region (invalid region) where no image is displayed. In the present exemplary embodiment, a planar view shape of liquid crystal display device 1 is a rectangular shape. Therefore, a planar view shape of image display region 1a is a rectangular shape, and a planar view shape of frame region 1b is a rectangular frame shape.

The plurality of pixels PX are made up of a plurality of types of pixels arranged periodically and repeatedly along the row direction. Specifically, the plurality of pixels PX are made up of three types of pixels including red pixel PXR, green pixel PXG, and blue pixel PXB. In this case, in the present exemplary embodiment, the three pixels of red pixel PXR, green pixel PXG, and blue pixel PXB are arranged in this order as one set repeatedly along the row direction. Note that the pixels PX of the same type are arranged in the column direction.

As shown in FIG. 2, liquid crystal display device 1 includes transistor 10 and pixel electrode 20 provided in each of the plurality of pixels PX, and common electrode 30 facing pixel electrode 20.

Further, liquid crystal display device 1 includes a plurality of gate lines 40 (scanning lines) extending along the row direction which is the first direction and a plurality of data lines 50 (video signal lines) extending along the column direction which is the second direction orthogonal to the first direction.

Liquid crystal display device 1 further includes gate lead line 41 connected to gate line 40 and dummy gate lead line 41A not connected to gate line 40. In the present exemplary embodiment, a plurality of gate lead lines 41 and a plurality of dummy gate lead lines 41A are provided. The plurality of gate lead lines 41 and the plurality of dummy gate lead lines 41A extend in the same direction as the plurality of data lines 50. That is, similarly to touch line 60, the plurality of gate lead lines 41 and the plurality of dummy gate lead lines 41A extend in the column direction. Accordingly, the plurality of gate lead lines 41 and the plurality of dummy gate lead lines 41A extend in the same direction as the plurality of data lines 50 and are orthogonal to the plurality of gate lines 40.

Further, liquid crystal display device 1 according to the present exemplary embodiment is an in-cell type liquid crystal display panel (in-cell touch panel) having not only a display function but also a touch function. Therefore, liquid crystal display device 1 further includes a plurality of touch lines 60 for detecting a touch position when a user touches liquid crystal display device 1. The plurality of touch lines 60 extend in the same direction as the plurality of data lines 50. Specifically, the plurality of touch lines 60 extend in the column direction.

Further, liquid crystal display device 1 according to the present exemplary embodiment includes dummy touch line 60A that does not contribute to detecting a touch position when the user touches liquid crystal display device 1. In the present exemplary embodiment, a plurality of dummy touch lines 60A are provided. The plurality of dummy touch lines 60A extend in the same direction as the plurality of data lines 50. That is, similarly to touch lines 60, the plurality of dummy touch lines 60A extend in the column direction.

Transistor 10 provided in pixel PX is a thin film transistor (TFT), and includes gate electrode 10G, source electrode 10S, and drain electrode 10D. Note that in the present specification, source electrode 10S and drain electrode 10D may be collectively referred to as a source/drain electrode. The source/drain electrode means at least one of source electrode 10S or drain electrode 10D, only either source electrode 10S or drain electrode 10D, or both source electrode 10S and drain electrode 10D.

Pixel electrodes 20 are provided in the plurality of pixels PX. In each of the plurality of pixels PX, pixel electrode 20 is connected to gate line 40 and data line 50 via transistor 10.

In the present exemplary embodiment, one transistor 10 and one pixel electrode 20 are provided for each pixel PX, but a plurality of transistors 10 and a plurality of pixel electrodes 20 may be provided for each pixel PX.

Pixel electrode 20 has, for example, a plurality of striped line electrodes. As an example, pixel electrode 20 is a comb-like electrode or an electrode in which a plurality of slits are formed. Note that the plurality of line electrodes in each pixel electrode 20 may be formed such that the directions of the linear line electrodes in two pixels PX adjacent in the column direction are inverted to form a substantially "<" shape for two pixels in the column direction, or may be bent in a "<" shape within one pixel PX.

Common electrode 30 is a counter electrode facing pixel electrode 20. As shown in FIG. 3, in the present exemplary embodiment, a plurality of common electrodes 30 are provided. Common electrodes 30 are arranged in the row direction and the column direction. That is, Common electrodes 30 are arranged in a matrix. The same common voltage (Vcom) is applied to each of the plurality of common electrodes 30.

Common electrode 30 has a rectangular shape and faces one or more pixel electrodes 20. In the present exemplary embodiment, Common electrode 30 has a rectangular shape provided across the plurality of pixels PX, and faces the plurality of pixel electrodes 20 corresponding to the plurality of pixels PX existing in the rectangular region. For example, each common electrode 30 is formed in a rectangular shape corresponding to several tens of pixels PX.

Liquid crystal display device 1 according to the present exemplary embodiment is a liquid crystal display panel having a touch sensing function based on a self-capacitive capacitance method. Therefore, common electrode 30 is also a touch electrode that forms a capacitance with pixel electrode 20. That is, common electrode 30 is paired with pixel electrode 20 and is used not only at the time of image display driving but is also used at the time of touch position detection driving. Each common electrode 30 is a unit electrode (touch electrode) for detecting a touch position. As described above, in the touch position detection driving, common electrodes 30 are configured as a plurality of touch electrodes each provided facing one or more pixel electrodes 20 and away from each other.

Common electrodes 30 are arranged in a matrix, and separated with regions on wires extending along the row direction (gate lines 40) and regions on wires extending along the column direction (data lines 50, gate lead lines 41, dummy gate lead line 41A, dummy touch line 60A) as separation regions.

A size of one common electrode 30 is, for example, 40×40 pixels. That is, the length in each of the row direction and the column direction of one common electrode 30 is the length of 40 pixels. In this case, there are 40 contact portions with one touch line 60 in one common electrode 30. Note that the size of one common electrode 30 is not limited to this but may be 32×32 pixels. Further, the shape of one common electrode 30 is not limited to a square but may be a rectangle.

Gate line 40 extending along the row direction supplies a gate signal to transistors 10. Gate line 40 is provided at a boundary between two pixels PX adjacent in the column direction in the image display region 1a. Gate line 40 extends, for example, linearly in the row direction.

Each gate line 40 is connected to transistors 10 of the plurality of pixels PX arranged in the row direction. Gate line 40 is connected to gate electrodes 10G of each transistor 10.

In the present exemplary embodiment, liquid crystal display device 1 has a dual-gate structure and a 2G1D wiring connection structure. Therefore, two gate lines 40 are provided for a boundary between two pixels PX adjacent in the column direction. That is, each two gate lines 40 are provided for a corresponding boundary between two pixel columns adjacent in the column direction.

Similarly to data line 50, gate lead lines 41 extending along the column direction and dummy gate lead lines 41A extending along the column direction are provided at a boundary between two pixels PX adjacent in the row direction in image display region 1a. Specifically, gate lead line 41 and dummy gate lead line 41A are provided between two pixel columns adjacent in the row direction. Gate lead lines 41 and dummy gate lead lines 41A extends, for example, linearly in the row direction, but may be formed such that the direction for each pixel is inverted to form a zigzag shape along the column direction.

The plurality of gate lead lines 41 and the plurality of dummy gate lead lines 41A are orthogonal to the plurality of gate lines 40. In the present exemplary embodiment, the plurality of gate lead lines 41 and the plurality of dummy gate lead lines 41A are formed in the same layer as the plurality of data lines 50. Therefore, the plurality of gate lead lines 41 and the plurality of dummy gate lead lines 41A intersect three-dimensionally with the plurality of gate lines 40 via the insulating film.

Gate lead line 41 supplies a gate signal that is output from gate driver 5 to gate line 40 corresponding to gate lead line 41. That is, gate lead line 41 is a relay wire for supplying the gate signal that is output from gate driver 5 to gate line 40 as a relay line. Therefore, gate lead line 41 is connected to gate line 40 at at least one of a plurality of intersections between the plurality of gate lines 40 and the plurality of gate lead lines 41. That is, gate line 40 is electrically connected to one or more gate lead line 41. Specifically, gate line 40 and gate lead line 41 are connected at at least one of a plurality of three-dimensional intersections of the plurality of gate lines 40 and the plurality of gate lead lines 41 in the image display region 1a via a gate contact hole.

For example, one gate line 40 and one gate lead line 41 are connected in one point. Thus, one gate line 40 is connected to one gate lead line 41 in one gate contact hole. Note that one gate line 40 may be connected to two or more gate lead lines 41. In this case, one gate line 40 is connected to a plurality of gate lead lines 41 at a plurality of gate contact holes.

As described above, in liquid crystal display device 1 according to the present exemplary embodiment, gate line 40 that is a lateral gate line extending along the row direction and a gate lead line 41 that is a vertical gate line extending along the column direction are each provided as a wire for the gate signal that is output from gate driver 5.

dummy gate lead lines 41A intersect three-dimensionally with gate lines 40, but is not connected to gate lines 40. Therefore, no gate signal is supplied to each dummy gate lead line 41A. Note that a predetermined voltage such as a common voltage (Vcom) may be applied to dummy gate lead line 41A, or the predetermined voltage may not be applied. That is, dummy gate lead line 41A may be a floating line.

data line 50 extending along the column direction supplies a data signal (video signal) to transistor 10 in pixels PX. data line 50 is provided at a boundary between two pixels PX adjacent in the row direction in the image display region 1a. In the present exemplary embodiment, data lines 50, gate lead lines 41, and dummy gate lead lines 41A are formed in the same layer. Further, data lines 50 and gate lead lines 41 are periodically and repeatedly provided at boundaries between two pixels PX adjacent in the row direction. Specifically, data lines 50 and gate lead lines 41 are alternately provided one by one at boundaries between two pixels PX adjacent in the row direction. That is, data lines 50 and gate lead lines 41 are alternately provided one by one for pixel columns including a plurality of pixels PX arranged in the column direction. For example, data lines 50 and gate lead lines 41 are arranged separately in odd lines or even lines in the pixel column.

Data line 50 is connected to transistors 10 of pixels PX arranged in the column direction. Specifically, data line 50 is connected to drain electrodes 10D of transistors 10. That is, in the present exemplary embodiment, data line 50 is a drain line. Note that data line 50 extends, for example, linearly in the row direction but may be formed such that the direction for each pixel is inverted to form a zigzag shape along the column direction.

Touch line 60 extending along the column direction is provided at a boundary between two pixels PX adjacent in the row direction in the image display region 1a, similarly to data line 50. Specifically, touch line 60 is provided between two pixel columns adjacent in the row direction. Touch lines 60 extends, for example, linearly in the row direction but may be formed such that the direction for each pixel is inverted to form a zigzag shape along the column direction.

As shown in FIG. 3, touch lines 60 are connected one-by-one to common electrodes 30 arranged in the column direction. Specifically, touch lines 60 (column touch line group) in each column of common electrodes 30 arranged in the column direction is provided so as to traverse all of the common electrodes 30 included in the column. However, each touch line 60 is connected to only one of the common electrodes 30 included in the column. Therefore, each common electrode 30 is connected to any one of touch lines 60 traversing common electrode 30, but is not connected to and is insulated from the other remaining touch lines 60. The number of touch lines 60 straddling the common electrodes 30 arranged in the column direction may only be the same as that of the common electrodes 30 arranged in the column direction.

Touch line 60 and common electrode 30 are formed via an insulating film, and touch line 60 and common electrode 30 corresponding to touch line 60 are connected through a contact hole formed in the insulating film. This contact hole becomes a contact portion that connects touch line 60 and common electrode 30.

Touch lines 60 extend in the same direction as data lines 50, gate lead lines 41, and dummy gate lead lines 41A, but are provided in a different layer from data lines 50, gate lead lines 41, and dummy gate lead lines 41A. Note that touch line 60 may overlap data lines 50 in a planar view.

Similarly to data line 50, dummy touch line 60A extending along the column direction is provided at a boundary between two pixels PX adjacent in the row direction in image display region 1a. Specifically, dummy touch line 60A is provided between two pixel columns adjacent in the row direction. In the present exemplary embodiment, the dummy touch line 60A is provided between the pixel columns in which dummy gate lead lines 41A are arranged, but the present disclosure is not limited to this. Dummy touch line 60A is provided in a separation region (touch-electrode boundary) that separates two common electrodes 30 adjacent in the row direction. Each touch line 60 extends, for example, linearly in the row direction but may be formed such that the direction for each pixel is inverted to form a zigzag shape along the column direction.

Unlike touch line 60, dummy touch line 60A does not contribute to detecting the touch position. Therefore, dummy touch line 60A is not connected to common electrode 30. Specifically, dummy touch line 60A provided between two common electrodes 30 adjacent in the column direction does not overlap common electrode 30. Thus, a contact portion for connecting dummy touch line 60A and common electrode 30 is not formed.

Dummy touch lines 60A extend in the same direction as data lines 50, gate lead lines 41, and dummy gate lead lines 41A, but dummy touch lines 60A is provided in a different layer from data lines 50, gate lead lines 41, and dummy gate lead lines 41A. In the present exemplary embodiment, dummy touch line 60A is formed in the same layer as touch line 60.

Dummy touch line 60A is provided between pixels same as the pixels between which dummy gate lead line 41A is disposed. In this case, dummy touch line 60A may overlap dummy gate lead line 41A in the planar view, respectively.

In the present exemplary embodiment, dummy touch line 60A is not connected to any wire in image display region 1a but is pulled out to frame region 1b, and a fixed voltage is applied to dummy touch line 60A. Specifically, the common voltage (Vcom) is applied to dummy touch line 60A in the same manner as common electrode 30 so that dummy touch line 60A and common electrode 30 have the same potential. The voltage applied to dummy touch line 60A is not limited to the common voltage but may be a predetermined voltage such as a gate-off voltage (Vgoff). Further, the predetermined voltage may not be applied to dummy touch line 60A. That is, dummy touch line 60A may be floating.

As shown in FIG. 1, liquid crystal display device 1 includes gate driver 5 and source driver 6 in order to display an image corresponding to an input video signal. Gate driver 5 and source driver 6 are driver Integrated circuits (ICs) (IC packages), for example.

Gate driver 5 and source driver 6 are mounted in frame region 1b of liquid crystal display device 1. Specifically, gate driver 5 and source driver 6 are mounted at the end of liquid crystal display device 1 by a chip-on-film (COF) method or a chip-on-glass (COG) method.

When gate driver 5 and source driver 6 are mounted by the COF method, a COF made of an anisotropic conductive film (ACF), in which gate driver 5 or source driver 6 is mounted on a flexible wiring board such as a flexible flat cable (FFC) or a flexible printed cable (FPC), is connected to an electrode terminal provided at an end of liquid crystal display device 1 by thermal press fitting.

On the other hand, when gate driver 5 and source driver 6 are mounted by the COG method, gate driver 5 and source driver 6 are directly mounted on an active matrix substrate of liquid crystal display device 1.

Note that both gate driver 5 and source driver 6 are not limited to be mounted by the COF method or the COG method, and one of gate driver 5 and source driver 6 may be mounted by the COF method and the other may be mounted by the COG method.

As shown in FIG. 2, gate driver 5 is electrically connected to gate line 40. In the present exemplary embodiment, gate driver 5 is electrically connected to gate line 40 via gate lead line 41. Gate driver 5 selects pixel PX where a data signal is to be written in accordance with a timing signal input from image processing unit 4, and supplies a gate line 40 with a voltage (gate-on voltage; Vgon) for turning on transistor 10 of the selected pixel PX. Thereby, a data voltage is supplied to pixel electrode 20 of the selected pixel PX via transistor 10.

Source driver 6 is connected to data line 50 of liquid crystal display device 1. Source driver 6 supplies a voltage (data voltage) corresponding to a video signal input from image processing unit 4 to data line 50 in accordance with the selection of gate line 40 by gate driver 5.

In the present exemplary embodiment, a source driver with a touch function is used as source driver 6. The source driver with a touch function is a driver in which an image display circuit necessary for performing image display driving and a touch position detection circuit necessary for performing touch position detection driving are shared. In the present exemplary embodiment, the plurality of data lines 50 and the plurality of touch lines 60 are connected to source driver 6 that is a source driver with a touch function. Further, by using touch line 60 as a common line, the source driver with a touch function supplies a common voltage (Vcom) to common electrode 30 via the common line.

Gate driver 5 and source driver 6 are mounted on one of a pair of sides in frame region 1b. That is, gate driver 5 and source driver 6 are provided on the same side of frame region 1b.

Specifically, gate driver 5 and source driver 6 are mounted at the end of liquid crystal display device 1 on the column-direction side. The mounting locations of gate driver 5 and source driver 6 are not limited to this, and gate driver 5 and source driver 6 may be mounted on different sides of frame region 1b.

As shown in FIG. 1, backlight 3 is disposed on the back surface side of liquid crystal display device 1 and irradiates liquid crystal display device 1 with light. In the present exemplary embodiment, backlight 3 is a light-emitting diode (LED) backlight including an LED as a light source, but is not limited to this. Backlight 3 is a direct type LED backlight in which LEDs are two-dimensionally arranged on a substrate so as to face liquid crystal display device 1, but may be an edge type backlight. Backlight 3 is a surface emitting unit that applies flat and uniform scattered light (diffused light). Backlight 3 may have an optical member such as a diffusion plate (diffusion sheet) in order to diffuse light from the light source.

Image processing unit 4 is a control device that includes an arithmetic processing circuit such as a central processing unit (CPU) and a memory such as a read-only memory (ROM) and a random-access memory (RAM). Video data to be displayed on liquid crystal display device 1 is input into image processing unit 4. In image processing unit 4, the CPU reads out and executes a program stored in the memory, thereby executing various processes.

Specifically, image processing unit 4 includes a timing controller or the like that performs various image signal processing, such as color adjustment, on video data input from an external system (not shown) and generates a video signal indicating a gradation value of each pixel PX and a timing signal indicating the timing for writing the video signal into each pixel PX. Image processing unit 4 outputs the video signal to source driver 6 and outputs the timing signal to gate driver 5.

Figure 4A:
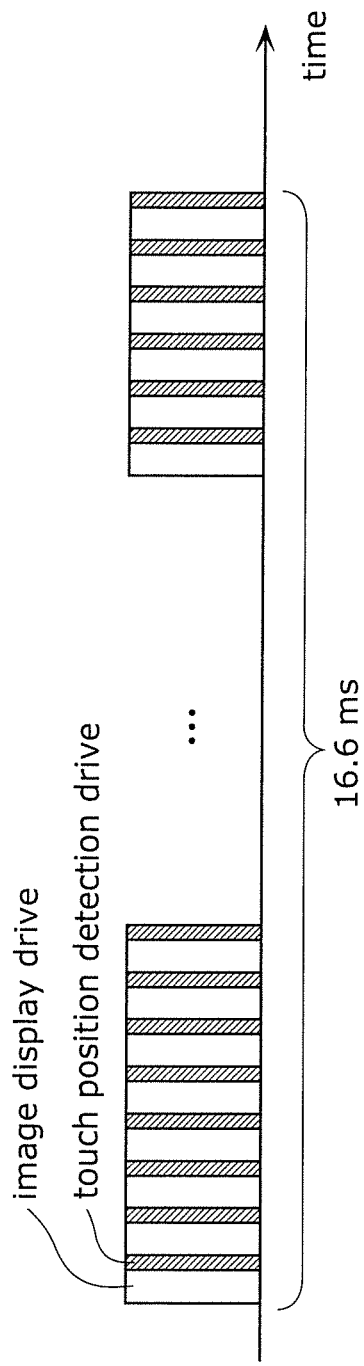
FIG. 4A is a diagram showing an example of image display driving and touch position detection driving in the liquid crystal display device.
Figure 4B:
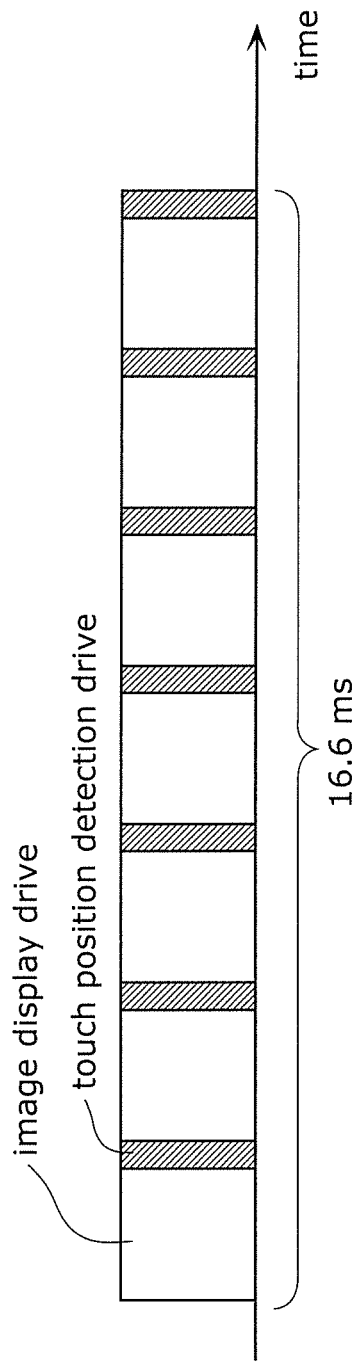
FIG. 4B is a diagram showing another example of image display driving and touch position detection driving in the liquid crystal display device.

Liquid crystal display device 1 according to the present exemplary embodiment has a display function and a touch function. That is, liquid crystal display device 1 performs image display driving and touch position detection driving. In this case, liquid crystal display device 1 uses touch line 60 to perform image display driving and touch position detection driving by time division. For example, as shown in FIGS. 4A and 4B, image display driving and touch position detection driving are alternately repeated a plurality of times within one frame period (16.6 ms). In this case, the touch position detection driving can be performed using, for example, a blanking period.

When liquid crystal display device 1 performs the image display driving, the gate-on voltage from gate driver 5 is supplied to gate line 40 via gate lead line 41. Thereby, transistor 10 of the selected pixel PX is turned on, and the data voltage is supplied to pixel electrode 20 from data line 50 connected to transistor 10. An electric field is generated in the liquid crystal layer due to the difference between the data voltage supplied to pixel electrode 20 and the common voltage supplied to common electrode 30. This electric field changes an alignment state of liquid crystal molecules in the liquid crystal layer in each pixel PX, and the light transmittance of backlight 3 passing through liquid crystal display device 1 is controlled for each pixel PX. Thereby, a desired image is displayed in image display region 1a of liquid crystal display device 1.

Further, when liquid crystal display device 1 performs the touch position detection driving, source driver 6 which is a source driver with a touch function detects a change in capacitance of each of the plurality of common electrodes 30 as a touch detection signal via touch line 60. Thereby, common electrode 30 at the touched position can be specified, and the position touched by the user can be detected.

Note that the control shown in FIG. 4B has a long driving period per image display driving and touch position detection driving as compared to the control shown in FIG. 4A. In the present exemplary embodiment, either the control shown in FIG. 4B or the control shown in FIG. 4A may be used. However, as compared to the control in FIG. 4A, in the control shown in FIG. 4B, the amount of image data stored into the memory during the touch position detection driving increases, and hence the chip size of the IC driver increases.

Figure 6:
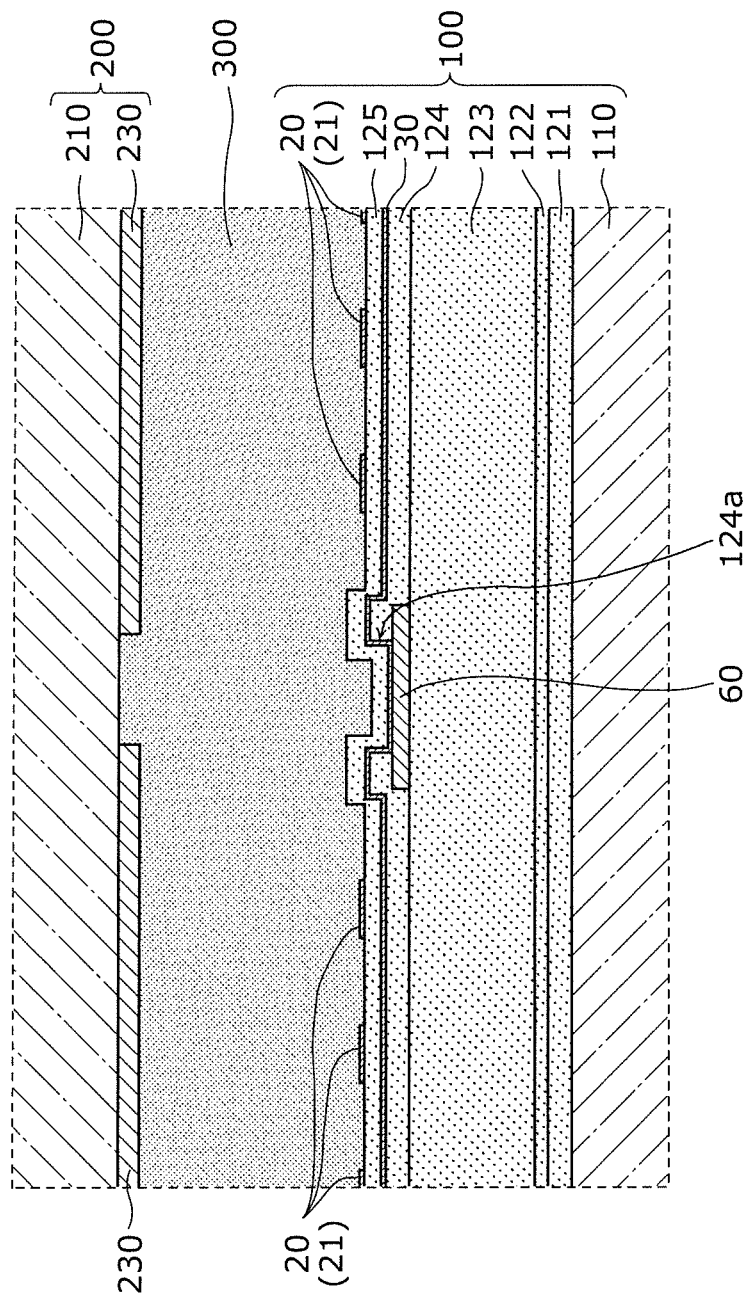
FIG. 6 is a cross-sectional view showing a configuration around a touch line in the liquid crystal display device according to the first exemplary embodiment.

Next, an example of a cross-sectional structure of liquid crystal display device 1 will be described with reference to FIGS. 5 and 6. FIG. 5 is a cross-sectional view showing a configuration around transistor 10 in pixel PX of liquid crystal display device 1 according to the first exemplary embodiment. FIG. 6 is a cross-sectional view showing a configuration around touch line 60 in the same liquid crystal display device 1.

As shown in FIG. 5, liquid crystal display device 1 includes first substrate 100, second substrate 200 facing first substrate 100, and liquid crystal layer 300 disposed between first substrate 100 and second substrate 200. In the present exemplary embodiment, first substrate 100 is located on the backlight 3 side, and second substrate 200 is located on the observer side. Although not shown, liquid crystal layer 300 is sealed between first substrate 100 and second substrate 200 by a frame-shaped sealing member.

First substrate 100 is a TFT substrate having a TFT as transistor 10. Specifically, first substrate 100 is an active matrix substrate in which a plurality of transistors 10 are arranged in a matrix. First substrate 100 includes not only transistor 10 but also various wires such as gate line 40, gate lead line 41, dummy gate lead line 41A, data line 50, touch line 60, and dummy touch line 60A, an insulating film that insulates the wires, pixel electrode 20, common electrode 30, and the like. These members are formed on first transparent substrate 110. First transparent substrate 110 is a transparent substrate such as a glass substrate, for example.

As shown in FIG. 5, transistor 10 formed on first transparent substrate 110 includes gate electrode 10G, source electrode 10S, drain electrode 10D, and semiconductor layer 10SC serving as a channel layer. In the present exemplary embodiment, transistor 10 is a TFT having a bottom gate structure, and includes gate electrode 10G formed on first transparent substrate 110, first insulating film 121 that is a gate insulator (GI) formed on gate electrode 10G, and semiconductor layer 10SC formed above gate electrode 10G via first insulating film 121. Source electrode 10S and drain electrode 10D are formed so as to cover a part of semiconductor layer 10SC. First insulating film 121 is formed over the entire surface of first transparent substrate 110 so as to cover gate electrode 10G.

For example, gate electrode 10G may be made of a metal film having a two-layer structure of a molybdenum film and a copper film, or may be made of a single-layer metal film made of a copper film or the like. First insulating film 121 may be made up of, for example, an insulating film having a two-layer structure of a silicon oxide film and a silicon nitride film, or may be made up of a single insulating film of a silicon oxide film or a silicon nitride film. For example, semiconductor layer 10SC may be made up of a semiconductor film having a two-layer structure of an i-amorphous silicon film and an n-amorphous silicon film, or may be made up of a semiconductor film having only one layer of the i-amorphous silicon film. For example, source electrode 10S and drain electrode 10D may be formed of a metal film having a two-layer structure of a molybdenum film and a copper film, or may be formed of a single metal film made of a copper film or the like.

Note that the materials of gate electrode 10G, source electrode 10S, drain electrode 10D, semiconductor layer 10SC, and first insulating film 121 are not limited to these. For example, as a material of semiconductor layer 10SC, an In—Ga—Zn—O-based oxide semiconductor or the like may be used.

As shown in FIG. 5, gate line 40 and data line 50 are formed on first substrate 100. Gate line 40 and data line 50 are formed on first transparent substrate 110.

Gate line 40 is formed in the same layer as gate electrode 10G. That is, gate line 40 and gate electrode 10G are formed by patterning the same metal film. Gate line 40 and gate electrode 10G are formed in a first wiring layer (GAL layer) that is a metal layer.

Data line 50 is formed in the same layer as source electrode 10S and drain electrode 10D. That is, data line 50, source electrode 10S, and drain electrode 10D are formed by patterning the same metal film. Data line 50, source electrode 10S, and drain electrode 10D are formed in a second wiring layer (SD layer) that is a metal layer on the first wiring layer.

Although not shown, gate lead line 41 and dummy gate lead line 41A are formed in the same layer as data line 50. That is, gate lead line 41 and dummy gate lead line 41A are formed in the SD layer, and gate lead line 41, dummy gate lead line 41A, data line 50, source electrode 10S, and drain electrode 10D are formed by patterning the same metal layer.

A first insulating film 121 is formed as a first insulating layer (GI layer) between the first wiring layer (GAL layer) and the second wiring layer (SD layer). First insulating film 121 is formed over the entire surface of first transparent substrate 110 so as to cover gate line 40 and gate electrode 10G. The first wiring layer, first insulating film 121, and the second wiring layer are TFT layers where transistor 10 which is a TFT is formed.

Note that source electrode 10S of transistor 10 is connected to pixel electrode 20 through a contact hole. Meanwhile, drain electrode 10D of transistor 10 is connected to data line 50. Specifically, a part of data line 50 is drain electrode 10D.

On first insulating film 121, second insulating film 122 is formed as a second insulating layer (PAS layer) so as to cover data line 50 and the source and drain electrodes of transistor 10. That is, data line 50 and the source and drain electrodes of transistor 10 are formed between first insulating film 121 and second insulating film 122. Second insulating film 122 is formed over the entire surface of first insulating film 121. Second insulating film 122 is configured of an inorganic insulating film made of an inorganic material such as a silicon nitride film, for example. Second insulating film 122, which is an inorganic insulating film, can be formed by, for example, a chemical vapor deposition (CVD) method.

Further, on second insulating film 122, third insulating film 123 is formed as a third insulating layer (OPAS layer). Third insulating film 123 is formed over the entire surface of second insulating film 122. In the present exemplary embodiment, a thickness of third insulating film 123 is larger than a thickness of second insulating film 122. Specifically, the thickness of third insulating film 123 is 10 times or more the thickness of second insulating film 122, and is 3000 nm as an example. Thereby, the distance in the thickness direction between the wire such as gate line 40 and data line 50 and common electrode 30 can be increased, so that a parasitic capacitance formed by the wire such as gate line 40 and data line 50 and common electrode 30 can be reduced. In addition, by increasing the thickness of third insulating film 123, the irregularities of the TFT layer caused by forming transistor 10, gate line 40, and data line 50 can be reduced, to planarize the TFT layer. As a result, third insulating film 123 having a planarized surface can be formed, so that common electrode 30 immediately above third insulating film 123 can be formed in a flat planar shape. That is, third insulating film 123 functions as a planarized layer.

Third insulating film 123 is configured of an organic insulating film made of an organic material containing carbon. Third insulating film 123, which is an organic insulating film, can be formed, for example, by applying and curing a liquid organic material. Thus, third insulating film 123 can be easily thickened, and the surface of third insulating film 123 can be easily planarized over all pixels PX.

Touch line 60 is formed on third insulating film 123. Although not shown, dummy touch line 60A formed in the same layer as touch line 60 is also formed on third insulating film 123. Touch line 60 and dummy touch line 60A are made of a low resistance material such as metal. For example, touch line 60 and dummy touch line 60A are metal films made of copper or the like. In the present exemplary embodiment, touch line 60 and dummy touch line 60A are copper wires made of a copper film. Touch line 60 and dummy touch line 60A are formed in a third wiring layer (CMT layer) that is a metal layer on the second wiring layer. Therefore, touch line 60 and dummy touch line 60A are provided in a different layer from gate line 40 and data line 50.

On third insulating film 123 and touch line 60, fourth insulating film 124 is formed as a fourth insulating layer (TPS layer). Third insulating film 123 also covers dummy touch line 60A formed in the same layer as touch line 60. Therefore, touch line 60 and dummy touch line 60A are formed between third insulating film 123 and fourth insulating film 124. Fourth insulating film 124 is formed over the entire surface of third insulating film 123 so as to cover touch line 60 and dummy touch line 60A. For example, an inorganic insulating film made of an inorganic material such as a silicon nitride film constitutes fourth insulating film 124.

On fourth insulating film 124, common electrode 30 is formed. Common electrode 30 is a transparent electrode made of a transparent metal oxide such as indium tin oxide (ITO). In the present exemplary embodiment, common electrode 30 is an ITO film. Common electrode 30 is formed in the fourth wiring layer (MIT layer) above the third wiring layer.

As described above, a plurality of common electrodes 30 are formed.

Specifically, as shown in FIG. 3, the common electrodes 30 are arranged in a matrix in a state of being separated from each other in the row direction and the column direction.

Further, the plurality of common electrodes 30 are formed over all the pixels PX in the image display region 1a. Thereby, the wiring of gate line 40, data line 50, and the like is covered by common electrode 30, so that the electric field generated in the wiring of gate line 40, data line 50, and the like can be shielded by common electrode 30. That is, the electric field generated in the TFT layer can be shielded by common electrode 30. Accordingly, the flexibility in designing the shape and size of pixel electrode 20 formed on common electrode 30 is improved, thereby facilitating improvement in light transmittance and the aperture ratio of pixel PX.

As shown in FIG. 6, common electrode 30 is connected to one touch line 60 through contact hole 124a formed in fourth insulating film 124. Thereby, at the time of performing the touch position detection driving, a change in capacitance of common electrode 30 at the position touched by the user can be detected via touch line 60 connected to common electrode 30.

In addition, although the ITO film has a relatively high resistance value, the resistance of common electrode 30 made of the ITO film can be reduced by connecting the touch line 60 made of a low-resistance metal film to common electrode 30, whereby a time constant of common electrode 30 can be lowered. That is, at the time of performing image display driving, touch line 60 can be used as a common line.

Furthermore, by providing common electrode 30 on touch line 60, touch line 60 can be covered with common electrode 30. Thereby, as compared to a case where the touch line 60 is provided on common electrode 30, corrosion of the touch line 60 made of a metal material that is easily corroded can be prevented.

On fourth insulating film 124 and common electrode 30, fifth insulating film 125 is formed as a fifth insulating layer (UPS layer). Fifth insulating film 125 is formed over the entire surface of fourth insulating film 124 so as to cover common electrode 30. Fifth insulating film 125 is made of an inorganic insulating film made of an inorganic material such as a silicon nitride film, for example.

On fifth insulating film 125, pixel electrode 20 is formed. Pixel electrode 20 faces common electrode 30 with fifth insulating film 125 placed therebetween. Pixel electrode 20 is a transparent electrode made of a transparent metal oxide such as indium tin oxide. In the present exemplary embodiment, pixel electrode 20 is an indium tin oxide (ITO) film like common electrode 30. Pixel electrode 20 is formed in a fifth wiring layer (PIT layer) on the fourth wiring layer.

Although not shown, an alignment film may be formed over the entire surface of fifth insulating film 125 so as to cover pixel electrode 20. In order to align initial alignment angles of the liquid crystal molecules in a certain direction, the alignment film is subjected to rubbing treatment.

Next, second substrate 200 will be described. Second substrate 200 is a counter substrate facing first substrate 100. As shown in FIGS. 5 and 6, second substrate 200 includes second transparent substrate 210, black matrix 220 formed on second transparent substrate 210, and color filter 230. Therefore, second substrate 200 is a color filter substrate (CF substrate) having color filter 230.

Similarly to first transparent substrate 110, second transparent substrate 210 is a transparent substrate such as a glass substrate, for example.

Black matrix 220 is a black light-shielding layer, and is made of carbon black, for example. Black matrix 220 is formed on the surface of the second transparent substrate 210 on the liquid crystal layer 300 side. Black matrix 220 is formed between two pixels adjacent in each of the row direction and the column direction. Therefore, black matrix 220 is formed so as to cover various wires arranged between the pixels. As an example, black matrix 220 is formed in a lattice shape as a whole.

Color filter 230 is formed for each of the plurality of pixels PX. Specifically, color filter 230 includes a red color filter, a blue color filter, and a green color filter corresponding to red pixel PXR, green pixel PXG, and blue pixel PXB, respectively. Each color filter is formed in a region between black matrices 220 (i.e., openings of black matrix 220).

Second substrate 200 includes a plurality of spacers 240. Spacer 240 is formed on second transparent substrate 210 so as to protrude toward first substrate 100. Spacer 240 is a columnar member for keeping a gap between first substrate 100 and second substrate 200 (cell gap) uniform. By providing spacer 240, the thickness of liquid crystal layer 300 can be easily kept uniform. As an example, spacer 240 has a cylindrical trapezoidal shape, and planar view shapes of the upper end and the lower end are circular. Spacer 240 is made of a resin material such as acrylic resin and can be deformed elastically. Spacer 240 can be formed in a predetermined pattern by, for example, photolithography.

To liquid crystal display device 1, a pair of polarizing plates (not shown) is attached. For example, one of the pair of polarizing plates is formed on the outer surface of first substrate 100, and the other of the pair of polarizing plates is formed on the outer surface of second substrate 200. The pair of polarizing plates are disposed so that the polarization directions are orthogonal to each other. A retardation plate may be bonded to the pair of polarizing plates.

Next, an action and the like of liquid crystal display device 1 according to the first exemplary embodiment will be described using FIG. 7 to FIG. 10, including the background to the present disclosure. FIGS. 7 to 10 are diagrams each showing a relationship between a pixel array and wires in one mode of liquid crystal display device 1 according to the first exemplary embodiment. Among these, FIG. 10 shows a relationship between a pixel array and wires in liquid crystal display device 1 shown in FIGS. 1 to 6 itself. In FIGS. 7 to 10, a thick solid line corresponding to "D" indicates data line 50, a one-dot chain line corresponding to "VG" indicates gate lead line 41, a thin solid line corresponding "T" indicates touch line 60, a thick broken line corresponding to "dmyVG" indicates dummy gate lead line 41A, a thin broken line corresponding to "dmyT" indicates dummy touch line 60A, and a solid line corresponding to "G" indicates gate line 40. Regions denoted by "R", "G", and "B" indicate the pixel column of red pixel PXR, the pixel column of green pixel PXG, and the pixel column of blue pixel PXB, respectively.

In a liquid crystal display device, a technique for providing a gate driver and a source driver on the same side of a frame region has been proposed for the purpose of narrowing the frame. For example, it is conceivable to provide a gate driver and a source driver at the end of the frame region in the column direction of the pixels. In this case, in order to electrically connect the gate line extending along the row direction and the gate driver mounted at the end in the column direction, it is conceivable that a gate lead line extending along the column direction is separately formed as a relay wire. Specifically, a plurality of gate lead lines are formed so as to be orthogonal to the gate lines, and the gate lead lines and the gate lines are connected at the intersections of the gate lead lines and the gate lines, whereby the gate lines and the gate driver are connected via gate lead lines.

With this configuration, since the gate lead line and the data line extend in the same direction, it is conceivable that the gate lead line and the data line are formed in the same layer in order to prevent an increase in the number of masks in the manufacturing process. That is, it is conceivable to pattern the gate lead line and the data line in the same process.

However, when the gate lead line and the data line extend in the same direction and the gate lead line and the data line are formed in the same layer, the gate lead line is also disposed between the pixels where the data line is disposed. As a result, two wires of the gate lead line and the data line are disposed in one space between pixels. This results in decreases in aperture ratio and transmittance of the pixel and deterioration in image quality.

Therefore, the inventors of the present application have made extensive studies to solve this problem. As a result, it has been found that, by devising the layout of the gate lead line and the data line, even when the gate lead line and the data line extend in the same direction and are formed in the same layer, it is possible to prevent decreases in aperture ratio and transmittance of the pixel.

Figure 7:
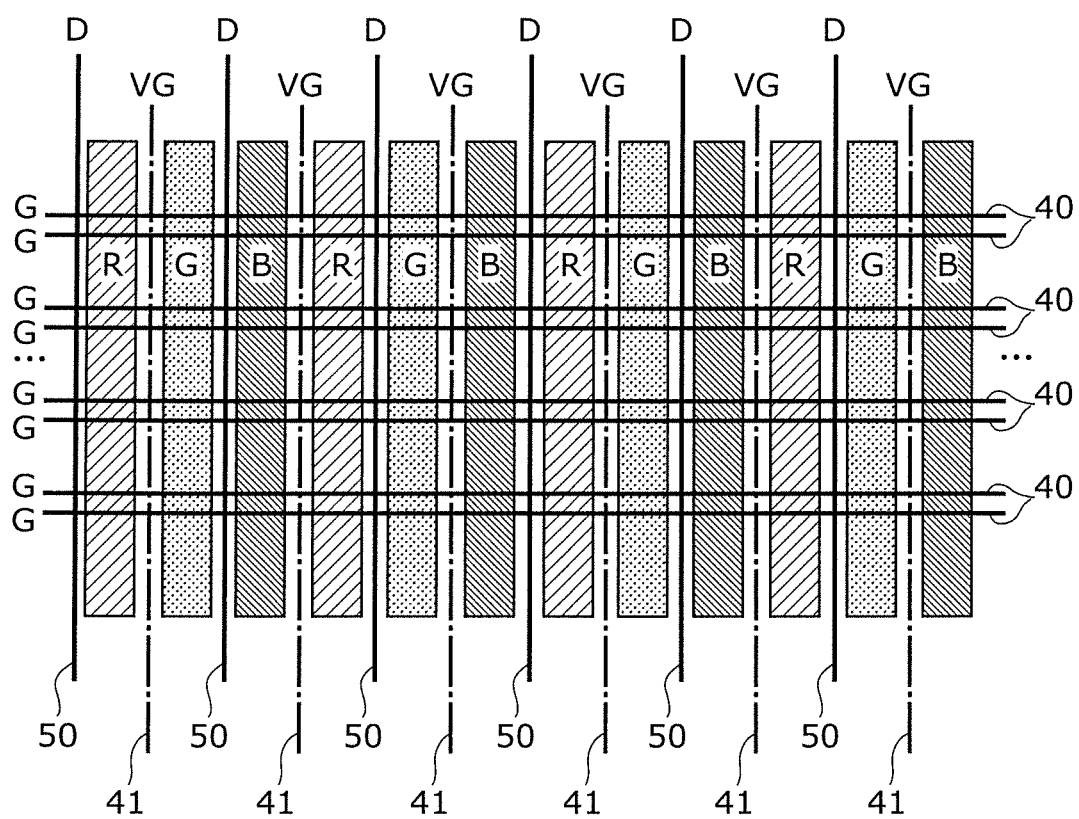
FIG. 7 is a diagram showing a relationship between a pixel array and wires in a first mode of the liquid crystal display device according to the first exemplary embodiment.

Specifically, first, a gate lead line and a data line are disposed by employing a dual-gate structure. In the dual-gate structure, as shown in FIG. 7, two gate lines 40 are disposed at a boundary between two pixels adjacent in the column direction, and data line 50 is provided for every two pixels in the row direction. That is, data line 50 is disposed for every other pixel. For example, data lines 50 are arranged only on odd lines or even lines of the pixel column.

By employing the dual-gate structure in this manner, there is a boundary of pixels between two adjacent data lines 50 where data line 50 is not formed. This, by using this empty boundary of the pixels, it is possible to form gate lead line 41 in the same layer as data line 50. That is, as shown in FIG. 7, one data line 50 and one gate lead line 41 are alternately provided one by one at each boundary between two pixels adjacent in the row direction. For example, when data lines 50 are arranged on the odd lines of the pixel columns, gate lead lines 41 are arranged on the even lines. Alternatively, when data lines 50 are arranged on the even lines of the pixel column, gate lead lines 41 are arranged on the odd lines.

As thus described, with to the configuration of the liquid crystal display device shown in FIG. 7, data lines 50 and gate lead lines 41 are formed in a same layer, and either of data lines 50 and gate lead lines 41 are selectively provided for boundaries between two pixels adjacent in the row direction. This eliminates the need to dispose two wires side by side in one space between pixel columns in the planar view.

As a result, even when gate lead line 41 and data line 50 intersecting gate line 40 extend in the same direction and are formed in the same layer, it is possible to prevent the decreases in aperture ratio and transmittance of pixel PX. It is thus possible to prevent the image quality from deteriorating as the aperture ratio and transmittance decrease.

Further, in recent years, an in-cell liquid crystal display device having a touch function has been studied. In this type of liquid crystal display device, touch lines respectively connected to common electrodes are formed in order to detect a position touched by the user. In this case, it is conceivable that the touch line and the data line are formed along the same direction and connected to the source driver with a touch function. For example, it is conceivable to form both the data line and the touch line so as to extend in the column direction. In this case, in addition to the data line and the gate lead line, a touch line is also formed as the wire extending along the column direction.

Figure 8:
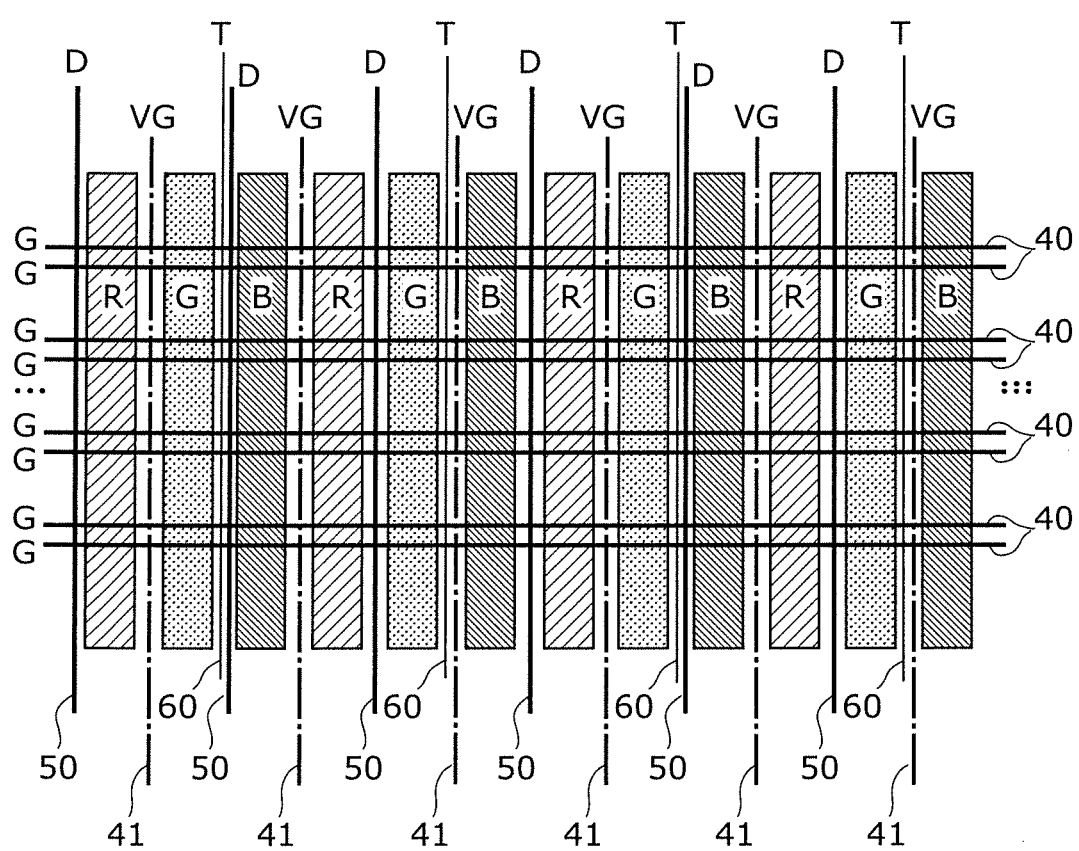
FIG. 8 is a diagram showing a relationship between a pixel array and wires in a second mode of the liquid crystal display device according to the first exemplary embodiment.

For example, when touch lines 60 extending along the column direction are arranged in the liquid crystal display device having the configuration shown in FIG. 7, a liquid crystal display device having the configuration shown in FIG. 8 is conceivable. Specifically, as shown in FIG. 8, it is conceivable to dispose touch line 60 only between green pixel PXG and blue pixel PXB. In this case, touch lines 60 are alternately arranged between the pixels where data line 50 is arranged and between the pixels where gate lead line 41 is arranged so as to overlap data line 50 and gate lead line 41 in the planar view.

For this reason, in the liquid crystal display device having the configuration shown in FIG. 8, a capacity of gate lead line 41 has periodicity, which may cause display unevenness. In particular, with a pulsed gate voltage being applied to gate lead line 41 connected to gate line 40, the sensitivity to display unevenness due to the capacitance of gate lead line 41 is high. Further, detection performance for a touch position may deteriorate due to the periodicity of the capacitance of touch line 60. Moreover, with a pulsed gate voltage being applied to gate lead line 41, display unevenness may occur due to a coupling capacitance between gate lead line 41 and touch line 60.

Figure 9:
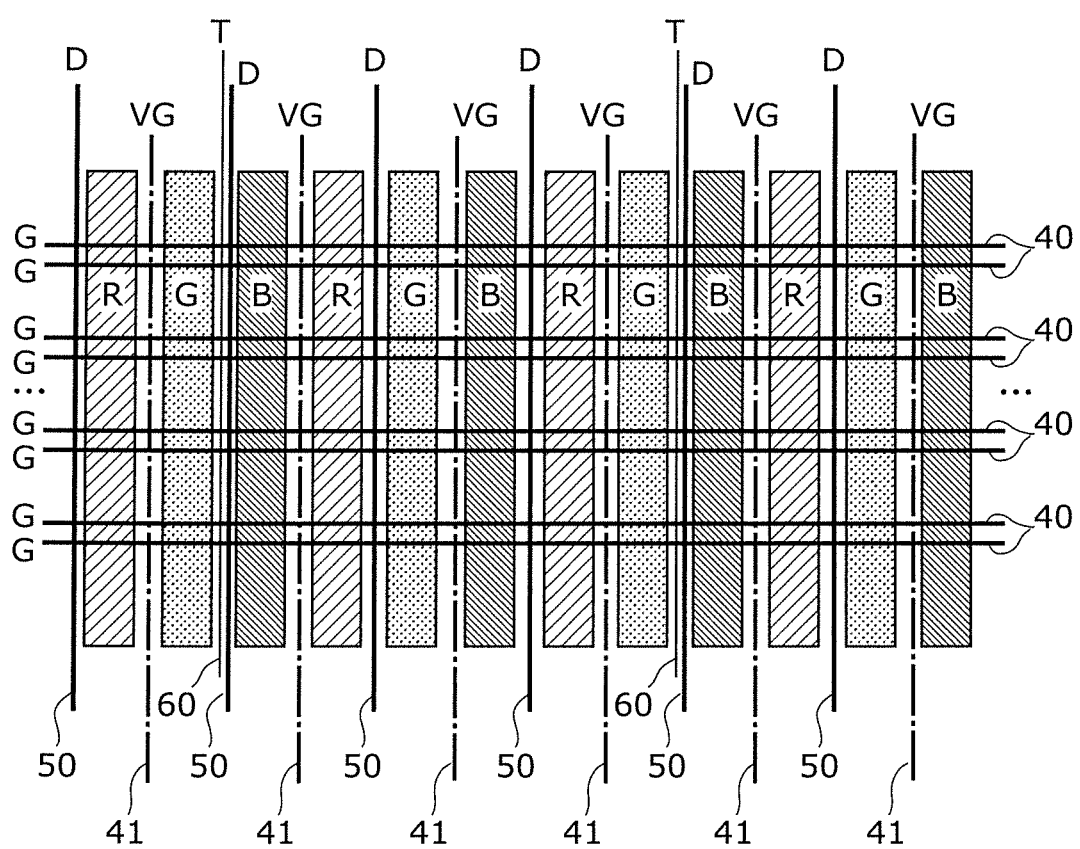
FIG. 9 is a diagram showing a relationship between a pixel array and wires in a third mode of the liquid crystal display device according to the first exemplary embodiment.
Figure 10:
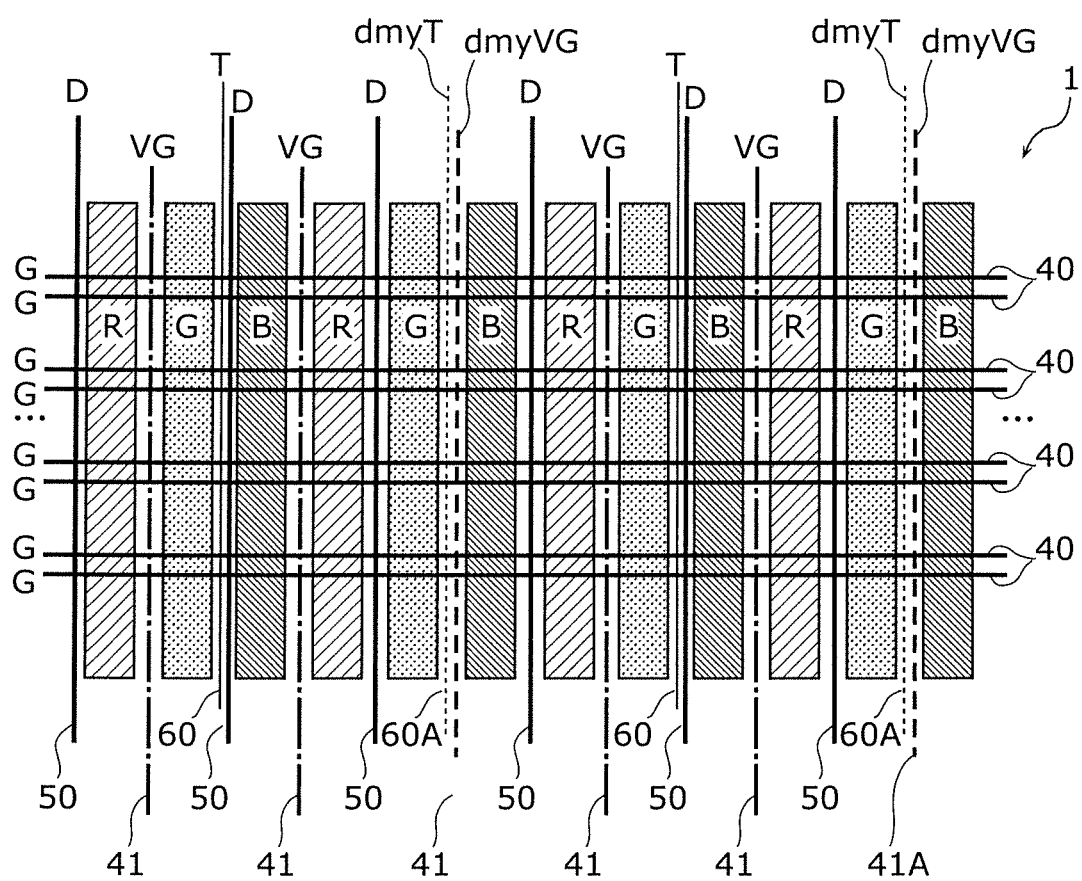
FIG. 10 is a diagram showing a relationship between a pixel array and wires in a fourth mode of the liquid crystal display device according to the first exemplary embodiment.

Then, a liquid crystal display device having the configuration shown in FIG. 9 is conceivable. Specifically, as shown in FIG. 9, touch line 60 is disposed only on data line 50, and touch line 60 is not disposed on gate lead line 41.

However, in the liquid crystal display device having the configuration shown in FIG. 9, among spaces each being between two adjacent pixels of the same type in combination, there exist a touch line placement space between pixels where touch line 60 is disposed and a touch line non-placement space between pixels where no touch line 60 is disposed. The touch line placement space between pixels and the touch line non-placement space between pixels are repeated periodically. For example, in FIG. 9, among the spaces each being between green pixel PXG and blue pixel PXB, a touch line placement space between pixels where touch line 60 is disposed and a touch line non-placement space between pixels where no touch line 60 is disposed exist repeatedly for every other pixel.

Thereby, in the liquid crystal display device having the configuration shown in FIG. 9, since the touch line placement space between pixels and the touch line non-placement space between pixels exist periodically and repeatedly, geometrical optical unevenness may occur to cause the deterioration in image quality.

Then, liquid crystal display device 1 having a configuration shown in FIG. 10 is conceivable. Liquid crystal display device 1 shown in FIG. 10 has a configuration in which in the liquid crystal display device shown in FIG. 8, touch line 60 and gate lead line 41 are replaced with dummy touch line 60A and dummy gate lead line 41A for the space between pixels where touch line 60 and gate lead line 41 overlap.

In this case, the boundaries, each of which is a boundary between two pixels PX adjacent in the row direction, alternately include a first boundary where data line 50 is disposed and a second boundary where gate lead line 41 or dummy gate lead line 41A is disposed. Touch line 60 is disposed at the first boundary, and the dummy touch line 60A is disposed at the second boundary.

With this configuration, it is possible to solve the problem of the liquid crystal display device having the configuration shown in FIG. 8 and the problem of the liquid crystal display device shown in FIG. 9.

That is, in the liquid crystal display device shown in FIG. 10, the capacity of gate lead line 41 can be shared, so that it is possible to prevent the display unevenness caused by the periodicity of the capacity of gate lead line 41. Moreover, since the capacitance of touch line 60 can be shared, it is possible to prevent a decrease in detection performance for the touch position caused by the periodicity of the capacitance of the touch line. Furthermore, since gate lead line 41 and touch line 60 do not overlap, it is possible to prevent the occurrence of display unevenness caused by the coupling capacitance between gate lead line 41 and touch line 60.

In liquid crystal display device 1 shown in FIG. 10, among spaces each being between two adjacent pixels of the same type in combination, touch line 60 or dummy touch line 60A that is relevant to touch line 60 is disposed. For example, in FIG. 10, among the spaces each being between green pixel PXG and blue pixel PXB, a space between pixels where touch line 60 is disposed and a space between pixels where dummy touch line 60A is not disposed are repeated for every other pixel. Hence it is possible to prevent the geometrical optical unevenness due to the placement and non-placement of touch lines 60.

In particular, in the present exemplary embodiment, touch line 60 or dummy touch line 60A is provided only in the space between green pixel PXG and blue pixel PXB (space between GB), and is not provided in the space between red pixel PXR and green pixel PXG (space between RG) or a space between red pixel PXR and blue pixel PXB (space between RB). As a result, color unevenness at the time of red single-color raster display can be effectively prevented, and countermeasures against lens unevenness can be achieved as compared with the first exemplary embodiment. Note that the lens unevenness refers to, for example, as described in JP-A-2017-167351, a phenomenon that, when light from the backlight reflected by touch line 60 or dummy touch line 60A is reflected again by another wire such as data line 50 and is transmitted to the observer side, color unevenness is seen depending on the wavelength reflection characteristics of touch line 60. For example, when touch line 60 is mainly made of copper, touch line 60 reflects a lot of red component light, so that the light from the backlight reflected by touch line 60 is reflected again by another wiring such as a data line and is transmitted from the red pixel to the observer side, causing color unevenness.

Thus, according to liquid crystal display device 1 shown in FIG. 10, the dual-gate structure is employed to extend gate lead line 41 and data line 50 intersecting gate line 40 in the same direction and in the same layer. Furthermore, even when touch line 60 is formed to provide the touch function, the deterioration in image quality can be prevented effectively.

Second Exemplary Embodiment

Figure 11:
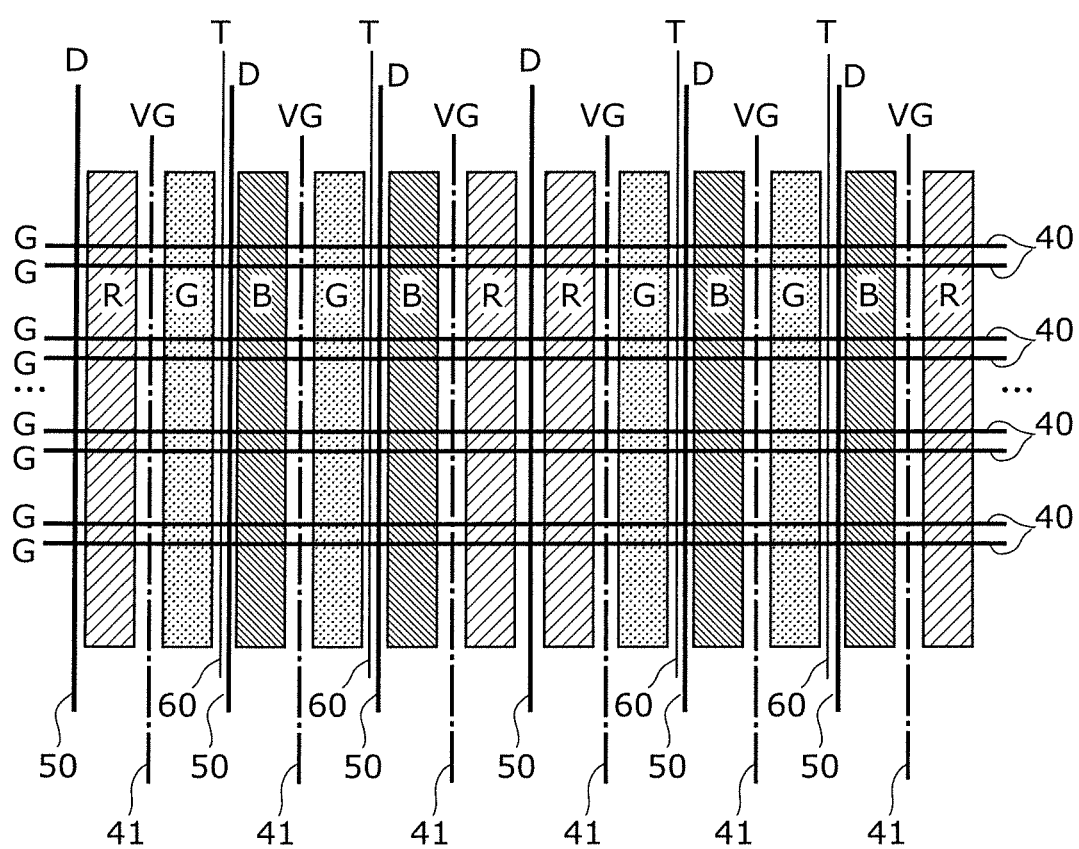
FIG. 11 is a diagram showing a relationship between a pixel array and wires in a liquid crystal display device according to a second exemplary embodiment.

Next, a liquid crystal display device according to a second exemplary embodiment will be described with reference to FIG. 11. FIG. 11 is a diagram showing a relationship between a pixel array and wires in the liquid crystal display device according to the second exemplary embodiment.

As in liquid crystal display device 1 according to the first exemplary embodiment, the liquid crystal display device according to the present exemplary embodiment includes: transistor 10 and pixel electrode 20 provided in each pixel PX; common electrodes 30 arranged in each of the row direction and the column direction; gate lines 40 extending along the row direction; gate lead lines 41 extending along the column direction; data lines 50 extending along the column direction; and touch lines 60 extending along the column and row directions.

The liquid crystal display device according to the present exemplary embodiment has also employed the dual-gate structure, and two of the plurality of gate lines 40 are provided at boundary between two pixels PX adjacent in the column direction.

However, in the liquid crystal display device according to the present exemplary embodiment, unlike liquid crystal display device 1 according to the above exemplary embodiment, dummy gate lead line 41A and dummy touch line 60A are not provided.

In the liquid crystal display device according to the present exemplary embodiment, as in liquid crystal display device 1 according to the first exemplary embodiment, the plurality of pixels PX are made up of three types of pixels including red pixel PXR, green pixel PXG, and blue pixel PXB. In the liquid crystal display device according to the present exemplary embodiment as well, as in liquid crystal display device 1 according to the first exemplary embodiment, the plurality of pixels PX are made up of a plurality of types of pixels that are periodically and repeatedly arranged along the row direction.

However, unlike liquid crystal display device 1 in the above exemplary embodiment, the array of the three types of pixels is different. Specifically, in the liquid crystal display device according to the present exemplary embodiment, as shown in FIG. 11, six pixels including red pixel PXR, green pixel PXG, blue pixel PXB, green pixel PXG, blue pixel PXB, and red pixel PXR, are arranged in this order as one set repeatedly along the row direction. That is, in the first exemplary embodiment, the three types of pixels PX including red pixel PXR, green pixel PXG, and blue pixel PXB, are arranged with the RGBRGB array as one cycle, but in the present exemplary embodiment, pixels PX are arranged with the RGBGBR array as one cycle. In FIG. 11, two periods are shown with RGBGBR as one period. Note that the pixels PX of the same type are arranged in the column direction.

In the liquid crystal display device according to the present exemplary embodiment, as in liquid crystal display device 1 according to the first exemplary embodiment, data lines 50 and gate lead lines 41 are formed in the same layer, and either of data lines 50 and gate lead lines 41 are selectively provided for boundaries between two pixels adjacent in the row direction. In the liquid crystal display device according to the present exemplary embodiment, touch lines 60 overlaps data lines 50 in the planar view respectively.

However, due to the absence of dummy gate lead line 41A and dummy touch line 60A, the liquid crystal display device according to the present exemplary embodiment is different from liquid crystal display device 1 according to the first exemplary embodiment in repetition layout of wires (data line 50, gate lead line 41, touch line 60) extending along the column direction.

That is, in the first exemplary embodiment, instead of maintaining the array of pixels PX in the RGBRGB array, dummy gate lead line 41A and dummy touch line 60A are provided separately, but in the present exemplary embodiment, instead of not separately providing dummy gate lead line 41A of the dummy touch line 60A, the array of pixels PX is changed to RGBGBR array.

The liquid crystal display device according to the present exemplary embodiment configured as described above can also solve the same problem as those of the liquid crystal display device according to the first exemplary embodiment.

That is, since the liquid crystal display device according to the present exemplary embodiment also includes the wire layout having the configuration shown in FIG. 7, even when gate lead lines 41 and data lines 50 intersecting gate lines 40 extend in the same direction and are formed in the same layer, it is possible to prevent the decreases in aperture ratio and transmittance of pixel PX. Hence it is possible to prevent deterioration in image quality.

Further, the liquid crystal display device according to the present exemplary embodiment can also solve the problem of the liquid crystal display device having the configuration shown in FIG. 8 and the problem of the liquid crystal display device shown in FIG. 9.

Specifically, in the liquid crystal display device according to the present exemplary embodiment as well, the capacitance of gate lead line 41 can be shared, so that the display unevenness caused by the periodicity of the capacitance of the touch line 41 can be prevented. Moreover, since the capacitance of touch line 60 can be shared, it is possible to prevent a decrease in detection performance for the touch position caused by the periodicity of the capacitance of the touch line. Further, since gate lead line 41 and touch line 60 do not overlap, the display unevenness caused by the coupling capacitance between gate lead line 41 and touch line 60 does not occur. In the liquid crystal display device according to the present exemplary embodiment as well, it is possible to prevent the geometric optical unevenness due to the placement and non-placement of touch lines 60.

As described above, even when in the liquid crystal display device according to the present exemplary embodiment, the dual-gate structure is employed and gate lead line 41 and data line 50 intersecting gate line 40 extend in the same direction and are formed in the same layer, and even when touch line 60 is disposed to provide a touch function, it is possible to effectively prevent the deterioration in image quality.

In addition, since the capacity of data line 50 can be shared, the display unevenness caused by the periodicity of the capacity of data line 50 can also be prevented.

In addition, since there is no need to provide dummy gate lead line 41A and dummy touch line 60A, an effective region in which data line 50 can be arranged can be increased, thereby preventing a useless increase in the length of the liquid crystal display device in the row direction. Thereby, a liquid crystal display device having vertically long (Landscape type) image display region 1a can be achieved easily. For example, image display region 1a having an aspect ratio of 3:2 can be achieved.

Furthermore, by not providing dummy gate lead line 41A or dummy touch line 60A, as compared to a case where dummy gate lead line 41A and dummy touch line 60A are provided, a resistance component generated due to a diagonal wire formed around frame region 1b can be made small. That is, when gate lead lines 41 are aggregated in frame region 1b for connection to gate driver 5, or data line 50 and touch line 60 are aggregated in frame region 1b for connection to source driver 6, around frame region 1b, a diagonal wire is formed as a relay wire to route the above wires, but by not providing dummy gate lead line 41A and dummy touch line 60A, the region of the diagonal wire can be reduced. Thereby, the length of the resistance component generated due to the length of the diagonal wire can be made small.

Third Exemplary Embodiment

Figure 12:
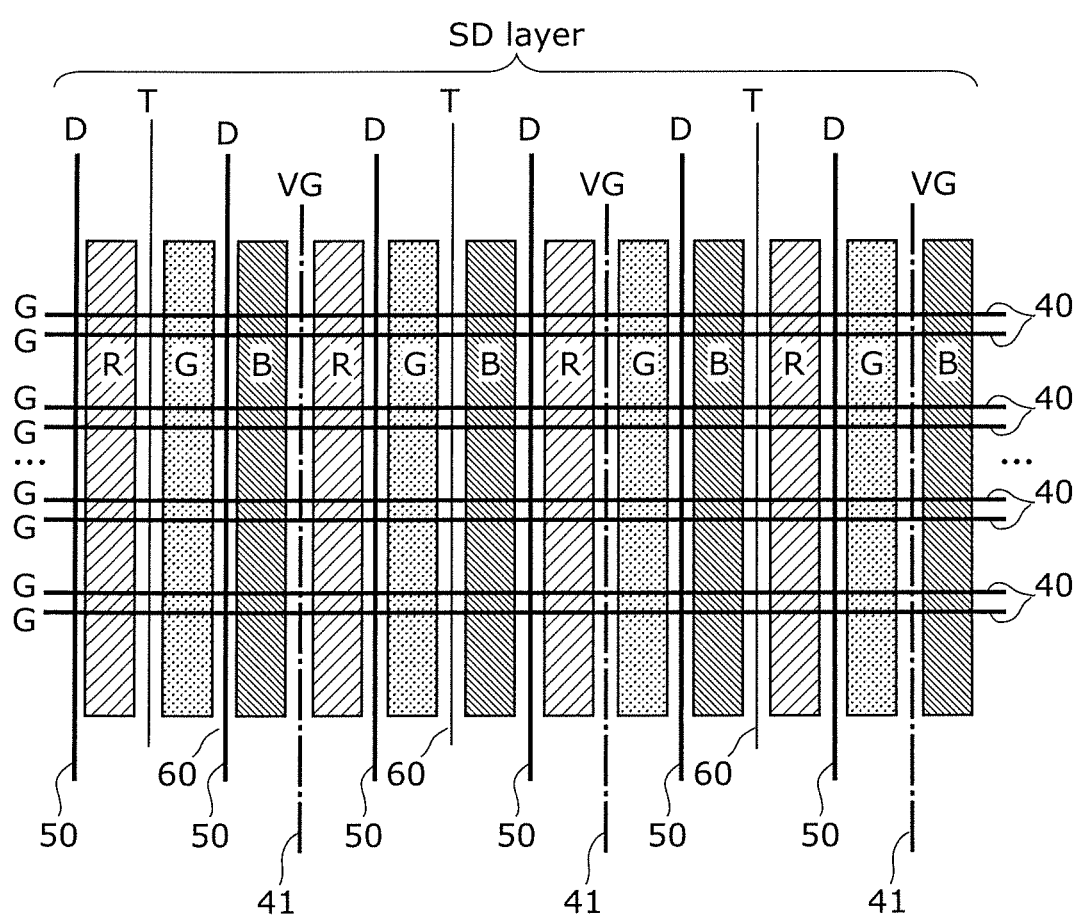
FIG. 12 is a diagram showing a relationship between a pixel array and wires in a liquid crystal display device according to a third exemplary embodiment.

Next, a liquid crystal display device according to a third exemplary embodiment will be described with reference to FIG. 12. FIG. 12 is a diagram showing a relationship between a pixel array and wires in the liquid crystal display device according to the third exemplary embodiment.

As in liquid crystal display device 1 according to the first exemplary embodiment, the liquid crystal display device according to the present exemplary embodiment includes: transistor 10 and pixel electrode 20 provided in each pixel PX; common electrodes 30 arranged in the row direction and the column direction; gate lines 40 extending along the row direction; gate lead lines 41 extending along the column direction; data lines 50 extending along the column direction; and touch lines 60 extending along the column and row directions.

The liquid crystal display device according to the present exemplary embodiment has also employed the dual-gate structure, and two of the plurality of gate lines 40 are provided at a boundary between two pixels PX adjacent in the column direction.

However, in the liquid crystal display device according to the present exemplary embodiment, unlike liquid crystal display device 1 according to the above exemplary embodiment, dummy gate lead line 41A and dummy touch line 60A are not provided.

In the liquid crystal display device according to the present exemplary embodiment, as in liquid crystal display device 1 according to the first exemplary embodiment, the plurality of pixels PX are made up of three types of pixels including red pixel PXR, green pixel PXG, and blue pixel PXB. In the liquid crystal display device according to the present exemplary embodiment, as in liquid crystal display device 1 according to the first exemplary embodiment, the three pixels of red pixel PXR, green pixel PXG, and blue pixel PXB are arranged in this order as one set repeatedly along the row direction. Specifically, in the liquid crystal display device according to the present exemplary embodiment as well, pixels PX are arranged with the RGBRGB array as one cycle. Note that the pixels PX of the same type are arranged in the column direction.

In the liquid crystal display device according to the present exemplary embodiment, the plurality of data lines 50 and the plurality of gate lead lines 41 are formed in the same layer as in liquid crystal display device 1 according to the first exemplary embodiment. Further, in the liquid crystal display device according to the present exemplary embodiment, not only data lines 50 and gate lead lines 41 but also touch lines 60 are formed in the same layer. That is, the plurality of data lines 50, the plurality of gate lead lines 41, and the plurality of touch lines 60 are formed in the same layer. Specifically, touch line 60 is formed in the SD layer in which data line 50 and gate lead line 41 are formed.

In the liquid crystal display device according to the present exemplary embodiment, as in liquid crystal display device 1 according to the first exemplary embodiment, data lines 50 and gate lead lines 41 are formed in the same layer, and either of data lines 50 and gate lead lines 41 are selectively provided for boundaries between two pixels adjacent in the row direction. Further, in the liquid crystal display device according to the present exemplary embodiment, not only data line 50 and gate lead line 41 but also touch lines 60 are periodically and repeatedly provided at boundaries between two pixels PX adjacent in the row direction.

Specifically, data lines 50 are provided for every two pixels PX arranged in the row direction, and gate lead lines 41 and touch lines 60 are alternatively provided one by one at boundaries between pixels PX where no data line 50 is provided.

That is, in the liquid crystal display device according to the present exemplary embodiment, three types of wire (data line 50, gate lead line 41, touch line 60) extending along the column direction are disposed in a space between pixels one by one by repetition of a cycle of four lines including data line 50, touch line 60, data line 50 and gate lead line 41, as one set.

The liquid crystal display device according to the present exemplary embodiment configured as described above can also solve the same problem as those of the liquid crystal display device according to the first exemplary embodiment.

For example, even in the liquid crystal display device according to the present exemplary embodiment, two wires are not arranged side by side in one space between pixel columns in the planar view, so that it is possible to prevent the decreases in aperture ratio and transmittance of pixel PX. Hence it is possible to prevent deterioration in image quality.

In the liquid crystal display device according to the present exemplary embodiment, touch line 60 is formed in the same layer as data line 50 and gate lead line 41, thereby eliminating the need for the wiring layer (CMT layer) configured to form touch line 60 and the need for fourth insulating film 124 (TPS layer) configured to insulate touch line 60 and common electrode 30. Thereby, the liquid crystal display device according to the present exemplary embodiment can reduce the number of masks in manufacturing as compared to liquid crystal display device 1 according to the first exemplary embodiment.

Modification

In the above, the liquid crystal display device, the image display device, and the like according to the present disclosure have been described based on the exemplary embodiments. However, the present disclosure is not limited to the first to third exemplary embodiments.

For example, in the first to third exemplary embodiments, data line 50 and drain electrode 10D of transistor 10 are connected, and pixel electrode 20 and source electrode 10S of transistor 10 are connected. However, the present disclosure is not limited to this. For example, data line 50 and source electrode 10S of transistor 10 may be connected, and pixel electrode 20 and drain electrode 10D of transistor 10 may be connected.

In the first to third exemplary embodiments, gate line 40 extends in the row direction, and data line 50, touch line 60, dummy touch line 60A, gate lead line 41, and dummy gate lead line 41A extend in the column direction. However, the present disclosure is not limited to this. Gate line 40 may extend in the column direction, and data line 50, touch line 60, dummy touch line 60A, gate lead line 41, and dummy gate lead line 41A may extend in the row direction. That is, the first direction may be the column direction and the direction orthogonal to the first direction may be the row direction. In this case, three types of pixels of red pixel PXR, green pixel PXG, and blue pixel PXB may be arranged periodically in the column direction in a predetermined arrangement, and gate driver 5 and source driver 6 may be mounted at an end of liquid crystal display device 1 on the row direction side.

In addition, the liquid crystal display devices in the first to third exemplary embodiments described above are in-cell touch panels having both a touch function and a display function. However, the present disclosure is not limited to this, and the liquid crystal display device only has the display function out of the touch function and the display function. In this case, the liquid crystal display device having no touch function does not include touch line 60 or dummy touch line 60A, and touch line 60 can be used as a common line. In this case, common electrode 30 may be a single solid electrode formed over the entire image display region 1a without being divided into a plurality of parts.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device having an image display region made up of a plurality of pixels arranged in a first direction and a second direction intersecting the first direction, the liquid crystal display device comprising:
   transistors and pixel electrodes respectively provided in the plurality of pixels;
   a common electrode facing the pixel electrodes;
   gate lines extending along the first direction and supplying gate signals to the transistors respectively;
   gate lead lines extending along the second direction and respectively connected to the gate lines at at least one of a plurality of intersections between the gate lead lines and the gate lines;
   data lines extending along the second direction and supplying data signals to the transistors respectively;
   touch lines extending along the second direction and configured to detect a touch position when a user touches the liquid crystal display device;
   dummy touch lines extending along the second direction, formed in a same layer as the touch lines, and electrically isolated from the common electrodes; and
   dummy gate lead lines extending along the second direction and electrically isolated from the gate lines,
   wherein
   the plurality of pixels are made up of a plurality of types of pixels arranged periodically and repeatedly along the first direction, with each of the plurality of types of pixels having a different color from the other types,
   the data lines and the gate lead lines are formed in a same layer, and
   either of the data lines and the gate lead lines are selectively provided for boundaries between two pixels among the plurality of pixels adjacent in the first direction,
   the data lines and the gate lead lines are alternately provided one by one at boundaries between two pixels adjacent in the first direction,
   a plurality of the common electrodes are arranged in the first direction and the second direction, and each faces one or more of the pixel electrode and are separated from each other,
   each touch line is connected to a corresponding one of the common electrodes, the touch lines are provided in a different layer from the data lines and the gate lead lines, in a planar view, each touch line overlaps a corresponding one of the data lines, and in the planar view, each dummy touch line overlaps a corresponding one of the dummy gate lead lines.

2. The liquid crystal display device according to claim 1, wherein the touch lines are provided for every plurality of pixels arranged in the first direction.

3. The liquid crystal display device according to claim 2, wherein the plurality of pixels include three types of pixels including a red pixel, a green pixel, and a blue pixel, and each touch line is provided only in a corresponding boundary between the green pixel and the blue pixel.

4. The liquid crystal display device according to claim 1, wherein the boundaries between two pixels adjacent in the first direction alternately include a first boundary where the data line is disposed, and a second boundary where the gate lead line or the dummy gate lead line is disposed.

5. The liquid crystal display device according to claim 4, wherein the touch line is disposed at the first boundary, and the dummy touch line is disposed at the second boundary.

6. The liquid crystal display device according to claim 1, wherein the plurality of pixels are made up of three types of pixels including a red pixel, a green pixel, and a blue pixel, and the three pixels of the red pixel, the green pixel and the blue pixel are arranged in this order as one set repeatedly along the first direction.

7. The liquid crystal display device according to claim 1, the plurality of pixels are made up of three types of pixels including a red pixel, a green pixel, and a blue pixel, six pixels of the red pixel, the green pixel, the blue pixel, the blue pixel, the red pixel, and the green pixel are arranged in this order as one set repeatedly along the first direction.

8. The liquid crystal display device according to claim 1, wherein two gate lines are provided for a boundary between two pixels adjacent in the second direction.

* * * * *